(12) United States Patent
Cao

(10) Patent No.: US 12,470,484 B2
(45) Date of Patent: Nov. 11, 2025

(54) TRAFFIC CONTROL METHOD AND RELATED DEVICE

(71) Applicant: Huawei Technologies Co., Ltd., Shenzhen (CN)

(72) Inventor: Ziqing Cao, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 48 days.

(21) Appl. No.: 18/468,897

(22) Filed: Sep. 18, 2023

(65) Prior Publication Data
US 2024/0007400 A1 Jan. 4, 2024

Related U.S. Application Data

(63) Continuation of application No. PCT/CN2022/076565, filed on Feb. 17, 2022.

(30) Foreign Application Priority Data

Mar. 19, 2021 (CN) .......................... 202110305257.8
Apr. 29, 2021 (CN) .......................... 202110475646.5

(51) Int. Cl.
H04L 45/74 (2022.01)
H04L 45/02 (2022.01)

(52) U.S. Cl.
CPC .............. H04L 45/74 (2013.01); H04L 45/02 (2013.01)

(58) Field of Classification Search
None
See application file for complete search history.

(56) References Cited

FOREIGN PATENT DOCUMENTS

| CN | 107026796 A | * | 8/2017 | ......... H04L 12/4641 |
| CN | 111355649 A | * | 6/2020 | |
| EP | 3226491 A1 | * | 10/2017 | ............. H04L 45/16 |
| EP | 3410656 A1 | | 12/2018 | |
| EP | 3836490 A1 | | 6/2021 | |

(Continued)

OTHER PUBLICATIONS

D. Levi et al., "Definitions of Managed Objects for Bridges with Traffic Classes, Multicast Filtering, and Virtual LAN Extensions", Jan. 2006, RFC 4363, total 99 pages.

(Continued)

Primary Examiner — Lance Leonard Barry
(74) Attorney, Agent, or Firm — Slater Matsil, LLP

(57) ABSTRACT

Embodiments disclose methods and devices for traffic control. A border gateway protocol (BGP) route advertisement message is sent by a control management device, where the message advertises a virtual private network (VPN) route instructing a device to redirect a VPN route to iterate to a first next hop (a private IP address) of a private network (towards reaching an IP address prefix), the IP address prefix to a destination host, and a network address of the first next hop towards reaching the IP address prefix. A virtual routing and forwarding (VRF) entry, including the IP address prefix and outbound interface information connected to the first next hop, is generated based on the indication information. The outbound interface information is determined in a local VRF table based on the indication information and network address of the first next hop, and the VRF entry is generated and used for controlling network traffic.

19 Claims, 9 Drawing Sheets

(56) References Cited

FOREIGN PATENT DOCUMENTS

| | | | | |
|---|---|---|---|---|
| FR | 2908575 A1 | * | 5/2008 | ............ H04L 45/125 |
| WO | WO-2016066072 A1 | * | 5/2016 | ............. H04L 12/46 |
| WO | WO-2020029976 A1 | * | 2/2020 | ......... H04L 12/4633 |

OTHER PUBLICATIONS

E. Rosen et al., "BGP/MPLS IP Virtual Private Networks (VPNs)", Feb. 2006, RFC 4364, total 47 pages.

T. Bates et al., "Multiprotocol Extensions for BGP-4", Jan. 2007, RFC 4760, total 12 pages.

* cited by examiner

Format of MP_REACH_NLRI in a VPN route:

Format of MP_REACH_NLRI in a VPN route:

TRAFFIC CONTROL METHOD AND RELATED DEVICE

CROSS-REFERENCE TO RELATED APPLICATIONS

This application is a continuation of International Application No. PCT/CN2022/076565, filed on Feb. 17, 2022, which claims priority to Chinese Patent Application No. 202110305257.8, filed on Mar. 19, 2021 and Chinese Patent Application 202110475646.5, filed on Apr. 29, 2021. All of the aforementioned patent applications are hereby incorporated by reference in their entireties.

TECHNICAL FIELD

This application relates to the field of communication technologies, and in particular, to a traffic control method and a related device.

BACKGROUND

According to a definition of the Request for Comments (RFC for short) 4364, a control management device advertises a VPN route to a provider edge (PE for short) device based on a virtual private network version 4 (VPNv4 for short) address family, a virtual private network version 6 (VPNv6 for short) address family, or a Layer 3 Ethernet virtual private network (L3EVPN for short) address family. Because the VPN route can only be iterated to a public network tunnel, the PE device can only support to forward received traffic through the public network tunnel. As network requirements increase, traffic cannot be flexibly controlled in the foregoing solution.

Based on this, a traffic control method needs to be urgently provided. The control management device can send, in a lightweight and flexible manner, a VPN route used for traffic control to the PE device, so that the PE device is applicable to a plurality of different network scenarios based on the traffic control of the VPN route.

SUMMARY

Based on this, embodiments of this application provide a traffic control method and a related device. A VPN route sent by a control management device to a PE device can enable the PE device to support private network redirection forwarding, so that the control management device can control the PE device in a lightweight and flexible manner, and compatibility in a plurality of different network scenarios is implemented.

According to a first aspect, an embodiment of this application provides a traffic control method. In a first border gateway protocol (BGP for short) route advertisement message sent by a control management device to a first PE device, a VPN route, that is, a first VPN route, can be advertised based on a VPNv4 address family, a VPNv6 address family, or an L3EVPN address family. The first VPN route may include indication information, an internet protocol (IP for short) address prefix of a destination host, and a network address of a first next hop to the IP address prefix, where the network address of the first next hop is a private IP address. In this case, the first PE device that receives the first BGP route advertisement message may generate a first virtual route and forwarding (VRF for short) entry based on the indication information, where the first VRF entry includes the IP address prefix and first outbound interface information, and the first outbound interface information identifies a first outbound interface that is of the first PE device and that is connected to the first next hop. In this way, in this method, the indication information is included in the VPN route advertised by using the VPNv4 address family, the VPNv6 address family, or the L3EVPN address family, to indicate the PE device to redirect the VPN route to iterate to a next hop of a private network, in other words, the control management device can send, in a lightweight and flexible manner, the VPN route used for traffic control to the PE device, so that the PE device is applicable to a plurality of different network scenarios based on the traffic control of the VPN route. For example, the control management device advertises the first VPN route to the PE device, so that when receiving traffic of a same network segment to which a destination address and the IP address prefix belongs, the PE device can forward the traffic to the first next hop based on the first outbound interface corresponding to the first outbound interface information in the first VRF entry. This overcomes a problem that currently, the VPN route advertised by the control management device to the PE device can only support to be iterated to a public network tunnel, so that the PE device can only support to forward received traffic through the public network tunnel, and cannot support a function of private network redirection forwarding. In addition, the VPN route that enables the PE device to support the function of private network redirection is advertised based on an existing VPN address family without using another address family (such as a FlowSpec address family). This simplifies a process of network configuration and route advertisement, so that the control management device implements traffic control on the PE device in the lightweight and flexible manner.

That the first PE device generates a first VRF entry based on the indication information may also be understood as that the indication information instructs the first PE device to generate the first VRF entry.

In an example, the indication information in the first BGP route advertisement message may indicate that the network address of the first next hop is the private IP address, or may indicate that the first VPN route is a private network route. In this case, that the first PE device generates a first VRF entry based on the indication information may include: The first PE device searches for a corresponding private network based on an indication of the indication information, subscribes to, from the found private network, the first outbound interface information from a route management module based on the network address of the first next hop, and generates the first VRF entry based on the first outbound interface information and the IP address prefix.

In another example, the indication information in the first BGP route advertisement message may alternatively indicate the first PE device to determine, in a local VRF table, the first outbound interface information to the first next hop. The first outbound interface information identifies the first outbound interface that is of the first PE device and that is connected to the first next hop. In this case, when generating the first VRF entry based on the indication information, the first PE device does not need to pay attention to whether the network address of the first next hop is the private IP address or whether the first VPN route is a private network route. The first PE device only needs to determine, in the local VRF table based on the indication information, the first outbound interface information to the first next hop, to generate the first VRF entry including the first outbound interface information and the IP address prefix.

In this way, the first PE device can cross traffic to the private network based on the first VPN route sent by the control management device, and generate outbound interface information to indicate a VRF entry of the next hop of the private network, so that it is possible for the first PE device to support the function of private network redirection forwarding.

In an example, the first BGP route advertisement message includes a next hop address field, the indication information may be a route distinguisher RD included in the next hop address field, and the RD is of a non-zero value. In a case, if the destination host and the first next hop belong to a same VPN, a value of an RD field may be any non-zero value. In another case, if the destination host and the first next hop belong to different VPNs, a value of an RD field may be a non-zero value used to identify a VPN to which the first next hop belongs, so that the first PE device accurately generates the first VRF entry based on the RD field. In this way, after receiving the first BGP route advertisement message, the first PE device may obtain the indication information and the network address of the first next hop by parsing the next hop address field, so that it is possible for the first PE device to quickly process the first VPN route.

In another example, the indication information may alternatively be carried in another field. For example, an extended attribute may be added to the first BGP route advertisement message. The extended attribute is used to carry the indication information. When the first BGP route advertisement message received by the first PE device includes the extended attribute, the first PE device may determine that the first BGP route advertisement message includes the indication information. On the contrary, if the first BGP route advertisement message received by the first PE device does not include the extended attribute, the first PE device may determine that the first BGP route advertisement message does not include the indication information.

It should be noted that, provided that the first PE device can identify the indication information after receiving the first BGP route advertisement message, and generate the first VRF entry based on the indication information, a manner of carrying the indication information in the first BGP route advertisement message is not limited in this embodiment of this application.

In an implementation, the first next hop may be a traffic cleaning server. The method is applicable to importing traffic into the traffic cleaning server to analyze and collect statistics on the traffic, and may further identify traffic that has security risks such as attacks and tampering. In different scenarios, traffic that needs to be imported to the traffic cleaning server may be set based on an actual requirement.

In an example, the destination host and the first next hop belong to a same VPN. In this case, the first BGP route advertisement message may include that a route distinguisher (RD for short) of the same VPN is used as the indication information. The first BGP route advertisement message may further include a route target (RT for short). Values of the RD and the RT may be the same or different. The first PE device stores a correspondence between a local RT and the private network. In this case, after receiving the first BGP route advertisement message, the first PE device parses the first BGP route advertisement message to obtain the RT, and searches for a local RT that matches the RT, to cross the first VPN route to a private network corresponding to the local RT. In addition, the first PE device may further subscribe to the first outbound interface information from the route management module based on the network address of the first next hop in the first BGP route advertisement message. Therefore, the first PE device generates, in the private network that is crossed to, the first VRF entry including the first outbound interface information. According to the method provided in this embodiment of this application, the first VPN route advertised by the control management device can enable the first PE device to forward traffic to the private network in a non-inter-private network scenario, to implement private network redirection forwarding.

In another example, the destination host and the first next hop belong to different VPNs. In this case, the first BGP route advertisement message may include an RD indicating a VPN to which the first next hop belongs, and an export route target (ERT for short), where the ERT corresponds to the VPN to which the destination host belongs. After receiving the first BGP route advertisement message, the first PE device may parse the first BGP route advertisement message to obtain the ERT and the RD. In this case, the first PE device may search for a local import route target (IRT for short) that matches the ERT, to cross the first VPN route to a VPN corresponding to the local IRT. In addition, the first PE device may further subscribe to the first outbound interface information from the route management module based on the RD and the network address of a next hop in the first BGP route advertisement message. In this way, the first PE device may generate, in the VPN that corresponds to the destination host and that is crossed to, the first VRF entry including the first outbound interface information. It can be learned that, according to the method provided in this embodiment of this application, the first VPN route advertised by the control management device can enable the first PE device to also forward traffic to the private network in an inter-private network scenario, to implement private network redirection forwarding.

In the foregoing example, corresponding to different VPNs, the RD and the RT may have a same value, so that the first VRF entry can be accurately generated in an inter-VPN scenario. If the destination host belongs to a first VPN, and the first next hop belongs to a second VPN, the ERT in the first BGP route advertisement message corresponds to the first VPN, and the RD corresponds to the second VPN. In this way, after receiving the first BGP route advertisement message, the first PE device may cross the first VPN route to the first VPN based on the RT (or ERT). Then, the first PE device matches a VRF table of the second VPN based on the value of the RD, searches the VRF table of the second VPN for the first outbound interface information corresponding to the network address of the first next hop, and adds the first VRF entry corresponding to the first outbound interface information and the IP address prefix to the first VPN. In this way, because both a CE device and the destination host belong to the first VPN, after the first PE device receives traffic from the CE device, an interface for receiving the traffic corresponds to the first VPN. The first PE device searches a VRF table corresponding to the first VPN for the first VRF entry that matches a destination address of the traffic, guides forwarding of the traffic based on the first outbound interface information in the first VRF entry, and forwards the traffic to the first next hop belonging to the second VPN.

In an implementation, after the generating the first VRF entry on the first PE device, the method may further include: The first PE device receives first traffic sent by a first customer edge (CE for short) device. A destination address of the first traffic and the IP address prefix belong to a same network segment. In this case, the first PE device may forward the first traffic to the first next hop through the first outbound interface. For example, when receiving the first traffic sent by the first CE device, the first PE device may determine a VPN to which the interface for receiving the first traffic belongs, and search a VRF table of the VPN for the first VRF entry of the same network segment to which the IP address prefix and the destination address of the first traffic belong. The first PE device obtains the first outbound interface information in the first VRF entry, and sends the first traffic to the first next hop through the first outbound interface corresponding to the first outbound interface information. It can be learned that, according to the method provided in this embodiment of this application, the first VPN route advertised by the control management device can enable the first PE device to forward traffic to the private network, to implement private network redirection forwarding.

In an implementation, the first PE device may further receive a second BGP route advertisement message sent by the control management device, where the second BGP route advertisement message is used to advertise a second VPN route, and the first BGP route advertisement message and the second BGP route advertisement message use a same VPN address family. The second VPN route includes the IP address prefix and a network address of a second next hop to the IP address prefix, the second next hop is a second PE device, and the first PE device communicates with the second PE device through the public network tunnel. Therefore, the first PE device generates a second VRF entry based on the second BGP route advertisement message, where the second VRF entry includes the IP address prefix and second outbound interface information, and the second outbound interface information identifies a second outbound interface that is of the first PE device and that corresponds to the public network tunnel, in other words, the first PE device enters the public network tunnel through the second outbound interface. In this way, the control management device may advertise, to the first PE device, the second VPN route that supports iteration of traffic to the public network tunnel, so that the first PE device has a function of forwarding through the public network tunnel.

In an example, in this implementation, that the first PE device generates a second VRF entry based on the second VPN route may include: The first PE device determines the second outbound interface information in the local VRF table; and generates the second VRF entry based on the IP address prefix and the second outbound interface information. That the first PE device determines the second outbound interface information in the local VRF table may be that the first PE device determines, in the local VRF table based on a case in which the second VPN route is iterated to the public network tunnel, the second outbound interface information that reaches the second next hop and corresponds to the public network tunnel. In this way, the first PE device can cross traffic into the public network tunnel based on the second VPN route sent by the control management device, and generate outbound interface information to indicate the second VRF entry of the public network tunnel, so that the first PE device supports iteration to the public network tunnel. In other words, when receiving the traffic of the same network segment to which the destination address and the IP address prefix belong, the first PE device can forward the traffic to the public network tunnel based on the second outbound interface information in the second VRF entry.

In an implementation, in a scenario in which traffic is imported to the first next hop, the first PE device may include two different modes: Mode 1: redirection, and Mode 2: traffic copying.

In an example, if the first PE device supports Mode 1, only the first VRF entry may be generated on the first PE device. After receiving the traffic of the same network segment to which the destination address and IP address prefix belong, the first PE device forwards the traffic from the first outbound interface to the first next hop directly based on the first VRF entry.

In another example, if the first PE device supports Mode 2, the first PE device may generate the first VRF entry and the second VRF entry. In this case, the method may further include: The first PE device receives and copies second traffic sent by the second CE device, to obtain third traffic; and forwards the second traffic to the first next hop through the first outbound interface and forwards the third traffic to the second PE device through the second outbound interface. In this way, traffic that needs to be diverted to the private network is separately forwarded through the private network and the public network tunnel.

In an implementation, if the first PE device and the destination host are connected separately through a first path and a second path, and the first path includes the first next hop, the method may further include implementing load sharing or active/standby security switchover on traffic between the first PE device and the destination host. For example, if receiving fourth traffic sent by a third CE device to the destination host, the first PE device may perform load sharing on the fourth traffic through the first path and the second path. For another example, when the two paths are normal, the first path is used as a working path, and the first PE device may send the received traffic to the first next hop via the private network based on the first outbound interface corresponding to the first outbound interface information in the first VRF entry. Then, the first next hop forwards the traffic to the destination host. If a fault occurs on the first path, the first PE device may use the second path as the working path. In this case, the first PE device sends the received traffic to the destination host through the public network tunnel based on the second outbound interface corresponding to the second outbound interface information in the second VRF entry.

In an implementation, the first PE device may be a first autonomous system boundary router (ASBR for short), the first next hop is a second ASBR. A private network interface and a public network interface are included between the first ASBR and the second ASBR. The first ASBR reaches the IP address prefix via the second ASBR, and the first outbound interface is a private network interface that is of the first ASBR and that is connected to the second ASBR. In this scenario, the method provided in this embodiment of this application may further include: The first ASBR receives fifth traffic, where a destination address of the fifth traffic and the IP address prefix belong to a same network segment; and the first ASBR forwards the fifth traffic to the second ASBR through the first outbound interface. This scenario may be referred to as, for example, Option D. In a current Option D scenario, before performing inter-domain forwarding on traffic, ASBRs each need to apply for a private network label and send the applied private network label to a peer ASBR. When the traffic is forwarded between the ASBRs, a next hop address needs to be changed to a private network label of the peer ASBR. However, based on the technical solutions provided in this embodiment of this application, the first VPN route advertised by the control management device can enable the first PE device to directly forward the traffic through the private network interface based on the first VRF entry to a PE device in another domain. The first PE device does not need to apply for a private network label and does not need to perform private network label switching during inter-domain forwarding. This reduces private network label resources and workload of label switching.

According to a second aspect, an embodiment of this application further provides a traffic control method. The method is performed by a control management device. For example, the method may include: The control management device generates a first BGP route advertisement message, and sends the first BGP route advertisement message to a first PE device. The first BGP route advertisement message is used to advertise a first VPN route based on a VPNv4 address family, a VPNv6 address family, or an L3EVPN address family. The first VPN route includes indication information, an IP address prefix of a destination host, and a network address of a first next hop to the IP address prefix. The indication information instructs the first PE device to generate a first VRF entry, where the first VRF entry includes the IP address prefix and first outbound interface information, and the first outbound interface information identifies a first outbound interface that is of the first PE device and that is connected to the first next hop. In this way, in this method, the control management device includes the indication information in the VPN route advertised by using the VPNv4 address family, the VPNv6 address family, or the L3EVPN address family, to indicate the PE device to redirect the VPN route to iterate to a next hop of a private network, to send, in a lightweight and flexible manner, the VPN route used for traffic control to the PE device, so that the PE device is applicable to a plurality of different network scenarios based on the traffic control of the VPN route, for example, the PE device supports a function of private network redirection forwarding.

In an implementation, the first BGP route advertisement message includes a next hop address field, the indication information is a route distinguisher RD included in the next hop address field, and the RD is of a non-zero value. For example, the RD identifies a VPN to which the first next hop belongs.

In an implementation, the first next hop may be a traffic cleaning server.

In an implementation, the destination host and the first next hop may belong to a same VPN. Alternatively, the destination host and the first next hop may belong to different VPNs.

In an implementation, the method may further include: The control management device generates a second BGP route advertisement message, and sends the second BGP route advertisement message to the first PE device, where the second BGP route advertisement message is used to advertise a second VPN route, and the first BGP route advertisement message and the second BGP route advertisement message use a same VPN address family. The second VPN route includes the IP address prefix and a network address of a second next hop to the IP address prefix, the second next hop is a second PE device, and the first PE device communicates with the second PE device through a public network tunnel. The second BGP route advertisement message instructs the first PE device to generate a second VRF entry, where the second VRF entry includes the IP address prefix and second outbound interface information, and the second outbound interface information identifies a second outbound interface that is of the first PE device and that corresponds to the public network tunnel, in other words, the first PE device enters the public network tunnel through the second outbound interface. In this way, the control management device may advertise, to the first PE device, the second VPN route that supports iteration of traffic to the public network tunnel, so that the first PE device has a function of forwarding through the public network tunnel.

According to a third aspect, an embodiment of this application further provides a traffic control apparatus, where the apparatus is used in a first PE device, and the apparatus may include a receiving unit and a generating unit. The receiving unit is configured to receive a first border gateway protocol BGP route advertisement message sent by a control management device, where the first BGP route advertisement message is used to advertise a first VPN route based on a virtual private network version 4 VPNv4 address family, a virtual private network version 6 VPNv6 address family, or a Layer 3 Ethernet virtual private network L3EVPN address family, the first VPN route includes indication information, an IP address prefix of a destination host, and a network address of a first next hop to the IP address prefix. The generating unit is configured to generate a first virtual routing and forwarding VRF entry based on the indication information, where the first VRF entry includes the IP address prefix and first outbound interface information, and the first outbound interface information identifies a first outbound interface that is of the first PE device and that is connected to the first next hop.

That the generating a first VRF entry based on the indication information may alternatively be expressed as: The indication information instructs the first PE device to generate a first VRF entry.

The indication information in the first BGP route advertisement message may indicate that the network address of the first next hop is a private IP address, or may indicate that the first VPN route is a private network route. Alternatively, the indication information may alternatively indicate the first PE device to determine, in a local VRF table, the first outbound interface information to the first next hop, where the first outbound interface information identifies the first outbound interface that is of the PE device and that is connected to the next hop.

In an implementation, the generating unit may include a first determining subunit and a first generating subunit. The first determining subunit is configured to determine, in a local VRF table based on the indication information and the network address of the first next hop, the first outbound interface information to the first next hop. The first generating subunit is configured to generate the first VRF entry based on the IP address prefix and the first outbound interface information.

In an implementation, the first BGP route advertisement message includes a next hop address field, the indication information is a route distinguisher RD included in the next hop address field, and the RD is of a non-zero value. For example, the RD identifies a VPN to which the first next hop belongs.

In an implementation, the first next hop is a traffic cleaning server.

In an implementation, the destination host and the first next hop may belong to a same VPN. Alternatively, the destination host and the first next hop may belong to different VPNs.

In an implementation, the receiving unit in the apparatus is further configured to receive first traffic sent by a first customer edge CE device, where a destination address of the first traffic and the IP address prefix belong to a same network segment. The apparatus may further include a first sending unit, configured to forward the first traffic to the first next hop through the first outbound interface.

In an implementation, the receiving unit in the apparatus is further configured to receive a second BGP route advertisement message sent by the control management device, where the second BGP route advertisement message is used to advertise a second VPN route, and the first BGP route advertisement message and the second BGP route advertisement message use a same VPN address family. The second VPN route includes the IP address prefix and a network address of a second next hop to the IP address prefix, the second next hop is a second PE device, and the first PE device communicates with the second PE device through a public network tunnel. The generating unit is further configured to generate a second VRF entry based on the second BGP route advertisement message, where the second VRF entry includes the IP address prefix and second outbound interface information, and the second outbound interface information identifies a second outbound interface that is of the first PE device and that corresponds to the public network tunnel, in other words, the first PE device enters the public network tunnel through the second outbound interface.

In an implementation, the generating unit may further include a second determining subunit and a second generating subunit. The second determining subunit is configured to determine the second outbound interface information in the local VRF table. The second generating subunit is configured to generate the second VRF entry based on the IP address prefix and the second outbound interface information.

In an implementation, the receiving unit in the apparatus is further configured to receive second traffic sent by a second CE device. In this case, the apparatus may further include a copying unit and a second sending unit. The copying unit is configured to copy the second traffic to obtain third traffic. The second sending unit is configured to forward the second traffic to the first next hop through the first outbound interface. The second sending unit is further configured to forward the third traffic to the second PE device through the second outbound interface.

In an implementation, the first PE device is connected to the destination host separately through a first path and a second path, and the first path includes the first next hop. The receiving unit in the apparatus is further configured to receive fourth traffic sent by a third CE device. The apparatus may further include a third sending unit, where the third sending unit is configured to perform load sharing on the fourth traffic through the first path and the second path.

In an implementation, the first PE device is a first ASBR, the first next hop is a second ASBR, and the first outbound interface is a private network interface that is of the first ASBR and that is connected to the second ASBR. The receiving unit in the apparatus is further configured to receive fifth traffic, where a destination address of the fifth traffic and the IP address prefix belong to a same network segment. The apparatus further includes a fourth sending unit, where the fourth sending unit is configured to forward the fifth traffic to the second ASBR through the first outbound interface.

It should be noted that for specific implementations and effects of the traffic control apparatus provided in the third aspect of embodiments of this application, refer to related descriptions in the embodiment shown in the first aspect. Details are not described herein again.

According to a fourth aspect, an embodiment of this application further provides a traffic control apparatus, where the apparatus is used in a control management device, and the apparatus may include a generating unit and a sending unit. The generating unit is configured to generate a first BGP route advertisement message. The sending unit is configured to send the first BGP route advertisement message to a first provider edge PE device, where the first BGP route advertisement message is used to advertise a first VPN route based on a virtual private network version 4 VPNv4 address family, a virtual private network version 6 VPNv6 address family, or a Layer 3 Ethernet virtual private network L3EVPN address family, the first VPN route includes indication information, an IP address prefix of a destination host, and a network address of a first next hop to the IP address prefix. The indication information instructs the first PE device to generate a first virtual routing and forwarding VRF entry, where the first VRF entry includes the IP address prefix and first outbound interface information, and the first outbound interface information identifies a first outbound interface that is of the first PE device and that is connected to the first next hop.

In an implementation, the first BGP route advertisement message includes a next hop address field, the indication information is a route distinguisher RD included in the next hop address field, and the RD is of a non-zero value. For example, the RD identifies a VPN to which the first next hop belongs.

In an implementation, the first next hop is a traffic cleaning server.

In an implementation, the destination host and the first next hop may belong to a same VPN. Alternatively, the destination host and the first next hop may belong to different VPNs.

In an implementation, the generating unit in the apparatus may further configured to generate a second BGP route advertisement message, and the sending unit is further configured to send the second BGP route advertisement message to the first PE device, where the second BGP route advertisement message is used to advertise a second VPN route, and the first BGP route advertisement message and the second BGP route advertisement message use a same VPN address family. The second VPN route includes the IP address prefix and a network address of a second next hop to the IP address prefix, the second next hop is a second PE device, and the first PE device communicates with the second PE device through a public network tunnel. The second BGP route advertisement message instructs the first PE device to generate a second VRF entry, where the second VRF entry includes the IP address prefix and second outbound interface information, and the second outbound interface information identifies a second outbound interface that is of the first PE device and that corresponds to the public network tunnel, in other words, the first PE device enters the public network tunnel through the second outbound interface.

It should be noted that for specific implementations and effects of the traffic control apparatus provided in the fourth aspect of embodiments of this application, refer to related descriptions in the embodiment shown in the second aspect. Details are not described herein again.

According to a fifth aspect, this application provides a communication apparatus. The communication apparatus includes a memory and a processor. The memory is configured to store program code, and the processor is configured to execute instructions in the program code, to enable the communication apparatus to perform the method according to the first aspect and any implementation of the first aspect, or enable the communication apparatus to perform the method according to the second aspect and any implementation of the second aspect.

According to a sixth aspect, an embodiment of this application provides a communication system. The communication system includes a first PE device and a control management device. The first PE device is configured to perform the method according to the first aspect or any implementation of the first aspect, and the control management device is configured to perform the method according to the second aspect and any implementation of the second aspect.

According to a seventh aspect, this application provides a computer-readable storage medium. The computer-readable storage medium stores instructions. When the instructions are run on a computer, the computer is enabled to perform the method according to the first aspect and any implementation of the first aspect, or the computer is enabled to perform the method according to the second aspect and any implementation of the second aspect.

According to an eighth aspect, this application provides a computer program product, including a program. When the program is run on a processor, the method according to the first aspect or any implementation of the first aspect is implemented, or implements the method according to the second aspect or any implementation of the second aspect is implemented.

DETAILED DESCRIPTION OF ILLUSTRATIVE EMBODIMENTS

Figure 1A:
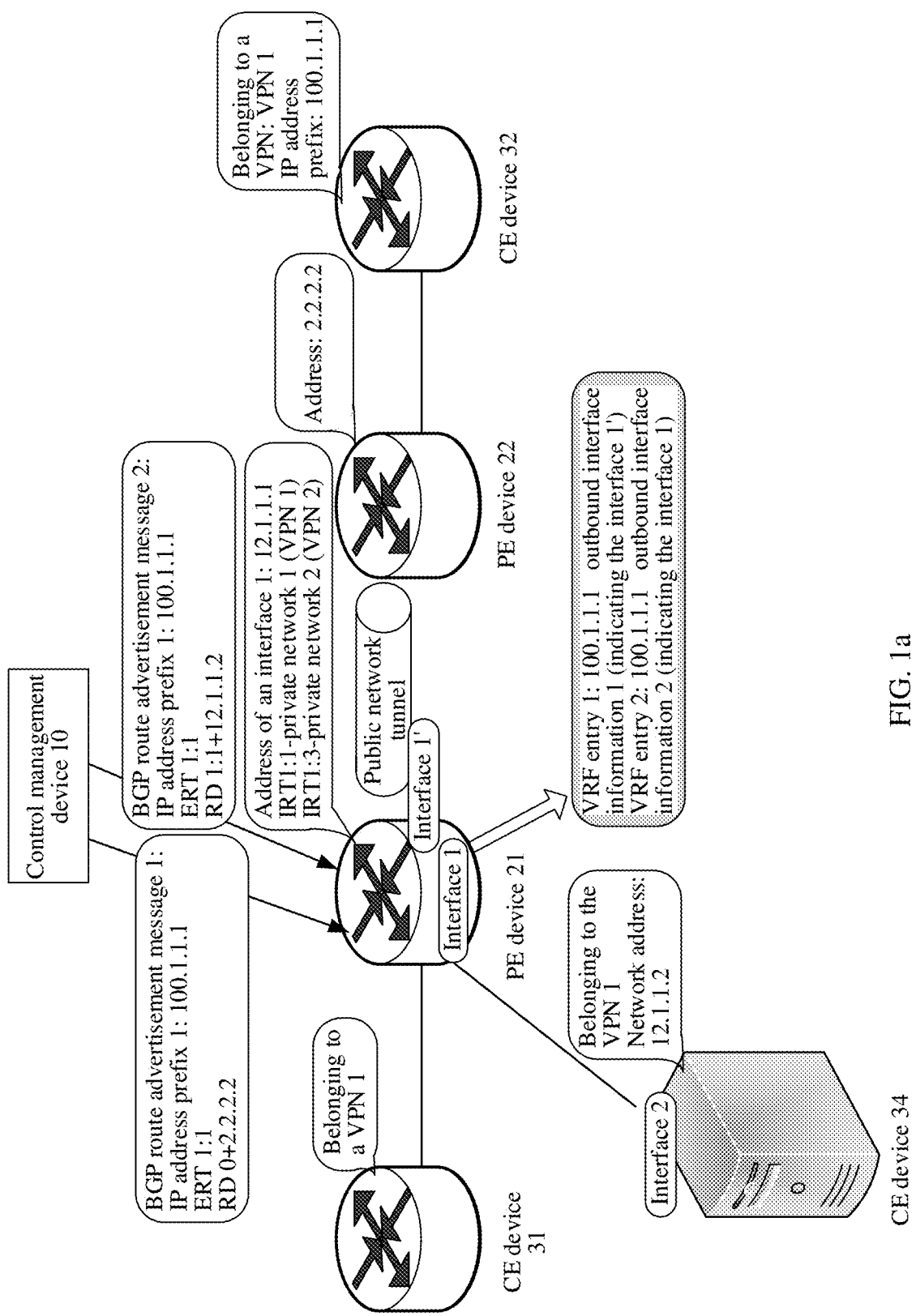
FIG. 1a is a schematic diagram of a network framework involved in an application scenario according to an embodiment of this application.

The following describes technical solutions of embodiments in this application with reference to accompanying drawings. A network architecture and a service scenario described in embodiments of this application are intended to describe the technical solutions in embodiments of this application more clearly, and do not constitute a limitation on the technical solutions provided in embodiments of this application. Persons of ordinary skill in the art may know that, with the evolution of the network architecture and the emergence of new service scenarios, the technical solutions provided in embodiments of this application are also applicable to similar technical problems.

Ordinal numbers such as "1", "2", "3", "first", "second", and "third" in this application are used to distinguish between a plurality of objects, but are not intended to limit a sequence of the plurality of objects.

It should be understood that "A and/or B" mentioned in this application includes the following cases: Only A is included, only B is included, or both A and B are included.

A routing and forwarding entry that guides forwarding behavior of a PE device may be generated by the PE device based on a route advertised by a control management device to the PE device, or may be determined by the PE device based on an access control list (ACL for short) manually configured on the PE device. Considering that the ACL is manually configured on the PE device, the control management device cannot control the forwarding behavior of the PE device. Therefore, in all technical solutions in embodiments of this application, the control management device advertises a route to the PE device to guide the forwarding behavior of the PE device.

Currently, in a case, the control management device may advertise a flow specification (FlowSpec for short) route to the PE device, to indicate the PE device to adjust traffic forwarding based on the FlowSpec route. However, a FlowSpec peer relationship needs to be established between the control management device and the PE device, and the control management device needs to advertise the FlowSpec route to the PE device based on a FlowSpec address family, resulting in a complex process. For example, the control management device and the PE device need to support not only a common VPNv4 address family, VPNv6 address family, or L3EVPN address family, but also the FlowSpec address family. In another case, the control management device may advertise a VPN route to the PE device based on a VPNv4 address family, a VPNv6 address family, or an L3EVPN address family. However, because the VPN route can only be iterated to a public network tunnel, the PE device can only support to forward received traffic through the public network tunnel, but cannot implement private network redirection forwarding. In other words, the control management device cannot advertise, to the PE device based on the VPNv4 address family, the VPNv6 address family, or the L3EVPN address family, the VPN route used to guide the PE device to implement private network redirection forwarding. However, with increasing network requirements, in many network scenarios (for example, a scenario in which the PE device directs traffic to a traffic cleaning server, a load balancing scenario, or an option D (Option D) scenario), the PE device needs to have a function of private network redirection forwarding. It can be learned that the foregoing solution cannot flexibly control traffic.

The private network redirection forwarding mentioned in embodiments of this application may be that the PE device replans the traffic to a next hop of a private network. For example, the traffic received by the PE device should normally be forwarded to a remote PE device through the public network tunnel based on a destination address of the traffic. However, if the PE device performs private network redirection forwarding on the traffic, based on a VRF entry that matches the destination address of the traffic and that is on the PE device, the traffic is finally redirected to a CE device in the private network, where the CE device is not a device indicated by the destination address of the traffic. However, regardless of whether the PE device performs private network redirection forwarding, the PE device controls the traffic based on the VRF entry.

Based on this, embodiments of this application provide a traffic control method. A control management device sends a BGP route advertisement message to a PE device. The BGP route advertisement message can advertise a VPN route based on a VPNv4 address family, a VPNv6 address family, or an L3EVPN address family. The VPN route may include indication information, an IP address prefix of a destination host, and a network address of a next hop to the IP address prefix. In this case, the PE device that receives the route advertisement message may generate a VRF entry based on an indication of the indication information in the route advertisement message, where the VRF entry includes the IP address prefix and outbound interface information. The outbound interface information identifies an outbound interface that is of the PE device and that is connected to the next hop.

In this way, the indication information is included in the VPN route advertised by using the VPNv4 address family, the VPNv6 address family, or the L3EVPN address family, to indicate the PE device to generate the VRF entry guiding private network redirection, so that the control management device can send, in a lightweight and flexible manner, the VPN route used for traffic control to the PE device, and the PE device is applicable to a plurality of different network scenarios based on the traffic control of the VPN route. This overcomes a problem that currently, the VPN route advertised by the control management device to the PE device can only support to be iterated to a public network tunnel, so that the PE device can only support to forward received traffic through the public network tunnel, and cannot support a function of private network redirection forwarding. In other words, according to the method provided in embodiments of this application, the control management device may advertise the VPN route to the PE device, so that the PE device has the function of private network redirection forwarding, or the control management device may advertise, to the PE device, the VPN route that supports only iteration of traffic to the public network tunnel, so that the PE device has a function of forwarding through the public network tunnel. In this way, lightweight and flexible control on the PE device by the control management device is implemented, and compatibility of the plurality of different network scenarios is also implemented.

In an example, the indication information in the BGP route advertisement message may indicate that the network address of the next hop is a private IP address, or may indicate that the VPN route is a private network route. In this case, that the PE device generates a VRF entry based on the indication information may include: The PE device searches for a corresponding private network based on the indication of the indication information, subscribes to, from the found private network, the outbound interface information from a route management module based on the network address of the next hop, and generates the VRF entry based on the outbound interface information and the IP address prefix.

In another example, the indication information in the BGP route advertisement message may alternatively indicate the PE device to determine, in a local VRF table, the outbound interface information to the next hop. The outbound interface information identifies the outbound interface that is of the first PE device and that is connected to the next hop. In this case, that a first PE device generates a first VRF entry based on the indication information may include: determining, in the local VRF table based on the indication of the indication information, the outbound interface information to the next hop, and generating the VRF entry including the outbound interface information and the IP address prefix. In this way, it is unnecessary to pay attention to whether the network address of the next hop is the private IP address or whether the VPN route is the private network route, and only an action of searching for the outbound interface information needs to be performed based on the indication of the indication information.

The following describes specific implementation and technical effects of embodiments of this application in several possible network scenarios.

In an example, an embodiment of this application is applicable to a scenario in which traffic is diverted to a private network. A network shown in FIG. 1a may include a control management device 10, a PE device 21, a PE device 22, a customer edge (CE for short) device 31, a CE device 32, and a CE device 34. The CE device 31 is connected to the CE device 32 through the PE device 21 and the PE device 22 in sequence, the PE device 21 is further connected to the CE device 34, the PE device 21 communicates with the PE device 22 through a public network tunnel, and the control management device 10 is connected to the PE device 21. According to current technical solutions, the control management device 10 may send a BGP route advertisement message 1 to the PE device 21, where the BGP route advertisement message 1 advertises a VPN route 1 based on a VPNv4 address family, a VPNv6 address family, or an L3EVPN address family. The VPN route 1 includes an IP address prefix 1 of a destination host and a network address of a next hop (that is, a network address of the PE device 22) to the IP address prefix 1. According to the definition of VPN routes in RFC 4364 and multiprotocol reachable network layer reachability information (MP_REACH_NLRI for short) in RFC 4760, a format of MP_REACH_NLRI in the BGP route advertisement message 1 is shown in FIG. 2a, and may include an address family identifier (AFI for short) field, a subsequent address family identifier (SAFI for short) field, a length of next hop network address field, a network address of next hop field, a reserved field, and a network layer reachability information NLRI field. A combination of the AFI and the SAFI indicates an address family on which the VPN route 1 is advertised, and a value of the length of next hop network address field indicates a length of the network address of next hop field. The network address of next hop field is a variable length field for indicating a network address of a next hop. For example, the network address of next hop field may be 00000000000000002020202, the first eight bytes are an RD field, in RFC 4364, a value of the RD field is stipulated to 0, and the remaining bytes (that is, 02020202) represent an address 2.2.2.2 of the PE device 22. In this case, the PE device 21 that receives the BGP route advertisement message 1 may determine, in a local VRF table based on a case in which the VPN route 1 is iterated to the public network tunnel, outbound interface information 1 that corresponds to the public network tunnel and that reaches the PE device 22, and generate a VRF entry 1. The VRF entry 1 includes the IP address prefix 1 and the outbound interface information 1. The outbound interface information 1 identifies an interface 1' that is of the PE device 21 and that corresponds to the public network tunnel, in other words, the PE device 21 enters the public network tunnel through the interface 1'. The outbound interface information 1 may be, for example, an address of the interface 1'. In this way, when the PE device 21 receives traffic 1 sent by the CE device 31, if a destination address of the traffic 1 and the IP address prefix 1 in the VRF entry 1 belong to a same network segment, the PE device 21 sends, based on the outbound interface information 1 in the VRF entry 1, the traffic 1 to the PE device 22 through the interface 1' via the public network tunnel, and then the PE device 22 forwards the traffic 1 to the destination host (that is, the CE device 32 or a host directly connected to the CE device 32). It can be seen that, in the current technical solutions, based on the VPN route advertised by the control management device 10, the PE device 21 cannot send traffic to a next hop (for example, the CE device 34) of a private network to implement private network redirection forwarding.

Figure 2A:
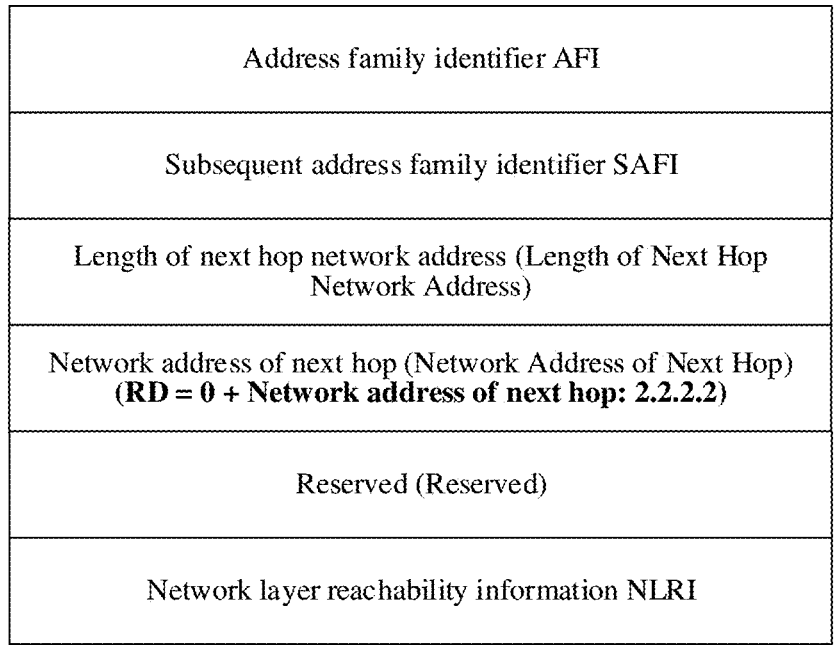
FIG. 2a is a schematic diagram of a format of current MP_REACH_NLRI.
Figure 2B:
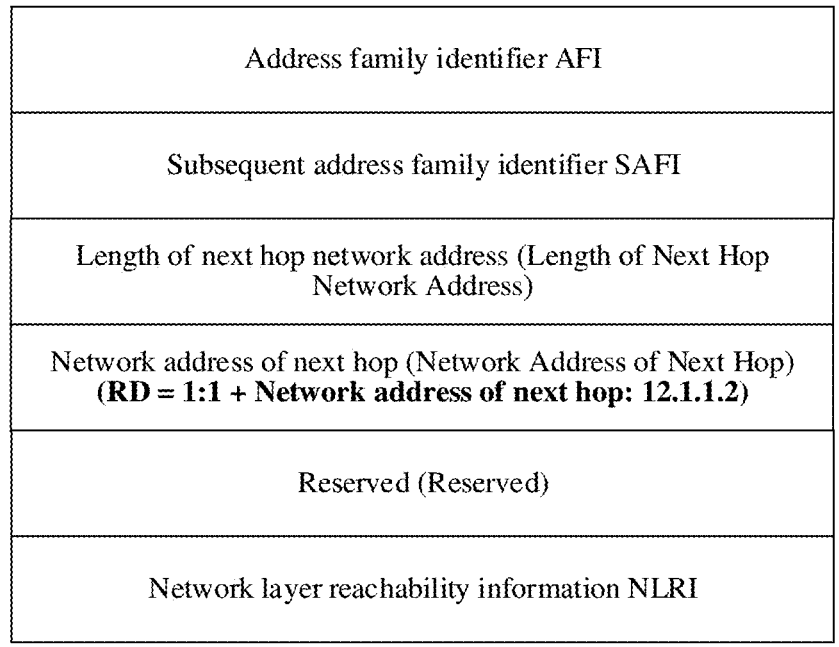
FIG. 2b is a schematic diagram of a format of MP_REACH_NLRI according to an embodiment of this application.

For the network shown in FIG. 1a, if there is a requirement for importing traffic of some characteristics to the CE device 34, for example, importing traffic whose destination address is 100.1.1.1 to the CE device 34, according to the method provided in embodiments of this application, an existing BGP route advertisement message may be extended, and indication information is set in the BGP route advertisement message. In this way, a PE device that receives the BGP route advertisement message may generate a corresponding VRF entry based on an indication of the indication information in the extended BGP route advertisement message. For example, the control management device 10 may send a BGP route advertisement message 2 to the PE device 21, where the BGP route advertisement message 2 advertises a VPN route 2 based on the VPNv4 address family, the VPNv6 address family, or the L3EVPN address family, the VPN route 2 may include indication information 1, the IP address prefix 1 of the destination host, and a network address 12.1.1.2 of a next hop to the IP address prefix 1, and the next hop is the CE device 34. A format of MP_REACH_NLRI in the BGP route advertisement message 2 is shown in FIG. 2b, and may include, for example, an AFI field, an SAFI field, a length of next hop network address field, a network address of next hop field, a reserved field, and an NLRI field. The network address of next hop field may be 00000001000000010C010102, where the first eight bytes are a value of an RD field and indicate the indication information 1 in this embodiment, and the value of the RD field is a non-zero value. The remaining bytes (that is, 0C010102) indicate the network address 12.1.1.2 of the CE device 34. Therefore, the PE device 21 that receives the BGP route advertisement message 2 may generate a VRF entry 2 based on an indication of the indication information 1, where the VRF entry 2 includes the IP address prefix 1 and outbound interface information 2. The outbound interface information 2 indicates an interface 1 that is of the PE device 21 and that is connected to the CE device 34. In this way, when the PE device 21 receives traffic 2 sent by the CE device 31, if a destination address of the traffic 2 and the IP address prefix 1 in the VRF entry 2 belong to a same network segment, the PE device 21 sends, based on the outbound interface information 2 in the VRF entry 2, the traffic 2 to the CE device 34 through the interface 1 corresponding to the outbound interface information 2. It can be learned that based on the technical solutions provided in this embodiment of this application, the VPN route advertised by the control management device 10 can enable the PE device 21 to import the traffic of some characteristics to the CE device 34, to implement private network redirection forwarding.

In FIG. 2a and FIG. 2b, AFI=1 and SAFI=128 indicate that the BGP route advertisement message is used to advertise the VPN route based on the VPNv4 address family. AFI=2 and SAFI=128 indicate that the BGP route advertisement message is used to advertise the VPN route based on the VPNv6 address family. AFI=25 and SAFI=70 indicate that the BGP route advertisement message is used to advertise the VPN route based on the L3EVPN address family.

In this scenario, the CE device 34 may be, for example, a traffic cleaning server, configured to analyze and collect statistics on traffic, and may further be configured to identify traffic that has a security risk such as attack and tampering. In different scenarios, traffic that needs to be imported to the traffic cleaning server may be set based on an actual requirement. For example, the control management device 10 may determine, based on an actual requirement, a characteristic of traffic that the PE device 21 needs to import to the traffic cleaning server, and advertise a corresponding VPN route based on the characteristic of the traffic. The characteristic of the traffic that needs to be diverted may include but is not limited to at least one of a source IP address, a destination IP address, a source port number, or a destination port number of the traffic. If the characteristic of the traffic that needs to be diverted is the destination IP address, the IP address prefix 1 in the VPN route 2 and the destination IP address may belong to a same network segment. In this way, the PE device 21 may generate the VRF entry 2 based on the received VPN route 2, so that the PE device 21 can import the traffic to the traffic cleaning server based on the VRF entry 2.

In this example, the traffic may be imported to the CE device 34 generally in two different modes: Mode 1: redirection, and Mode 2: traffic copying. When the traffic 2 reaches the PE device 21, whether redirection forwarding or traffic copying and forwarding needs to be specifically performed may be set on the PE device 21 based on an actual requirement, or may be that the control management device 10 sends a corresponding VPN route to the PE device 21 based on an actual requirement. In a case, the PE device 21 may support Mode 1, in other words, the PE device 21 may directly send the traffic 2 to the CE device 34 based on the VRF entry 2. The PE device 21 may support Mode 1. For example, the PE device 21 may receive only the BGP route advertisement message 2 sent by the control management device 10, but receive no BGP route advertisement message 1. Alternatively, the PE device 21 may receive the BGP route advertisement message 2 and the BGP route advertisement message 1 that are sent by the control management device 10, but on the PE device 21, the VRF entry 1 is set to be ineffective or a priority of the VRF entry 2 is higher than that of the VRF entry 1. In another case, the PE device 21 may alternatively support Mode 2, in other words, the PE device 21 may first copy the received traffic 2, to obtain traffic 2' that is the same as the traffic 2. Because destination addresses of the traffic 2 and the traffic 2' and the IP address prefix 1 in the VRF entry 1 and the VRF entry 2 belong to a same network segment, the PE device 21 may send the traffic 2 to the PE device 22 through the interface 1' based on the VRF entry 1. Then, the PE device 22 forwards the traffic 2 to the destination host. In addition, the PE device 21 may further send the traffic 2' to the CE device 34 through the interface 1 based on the VRF entry 2. The PE device 21 supports Mode 2. For example, the PE device 21 may receive the BGP route advertisement message 2 and the BGP route advertisement message 1 that are sent by the control management device 10, and a priority of the VRF entry 1 and a priority of the VRF entry 2 are set to be the same on the PE device 21.

The CE device may be a network device such as a switch or a router, or may be a host directly connected to the PE device.

It should be noted that, in the scenario embodiment shown in FIG. 1a, an example in which the CE device 34 and the CE device 31 belong to a same VPN 1 is used for description. The BGP route advertisement message 2 may include that a route distinguisher (RD for short) of the same VPN 1 is used as the indication information 1. The BGP route advertisement message 2 may further include a route target (RT for short). Values of the RD and the RT may be the same or different. The PE device 21 stores a correspondence between a local RT and the private network. In this case, a process that after receiving the BGP route advertisement message 2, the PE device 21 generates the VRF entry 2 based on the BGP route advertisement message 2 may include: The PE device 21 parses the BGP route advertisement message 2 to obtain RT of 1:1, searches for a local RT that matches the RT, and cross the VPN route 2 to a private network 1 corresponding to the local RT. In addition, the PE device 21 may further subscribe to the outbound interface information 2 from the route management module based on the RD and the network address 12.1.1.2 of the next hop in the BGP route advertisement message 2, so that the PE device 21 generates, in the private network 1 that is crossed to, the VRF entry 2 including the outbound interface information 2. That the RT in the BGP route advertisement message 2 matches the local RT may mean, for example, that the RT in the BGP route advertisement message 2 has a same value as the local RT. Optionally, the RD and the RT may have a same value (for example, 1:1). In this case, that the PE device 21 subscribes to the outbound interface information 2 from the route management module based on the RD of 1:1 and the network address 12.1.1.2 of the next hop may include: The PE device 21 matches a VRF table in the VPN 1 based on the RD of 1:1, and searches the VRF table of the VPN 1 for the outbound interface information 2 corresponding to 12.1.1.2. Then, the PE device 21 may add the VRF entry 2 corresponding to the outbound interface information 2 and the IP address prefix 1 to the VRF table corresponding to the VPN 1.

Figure 1B:
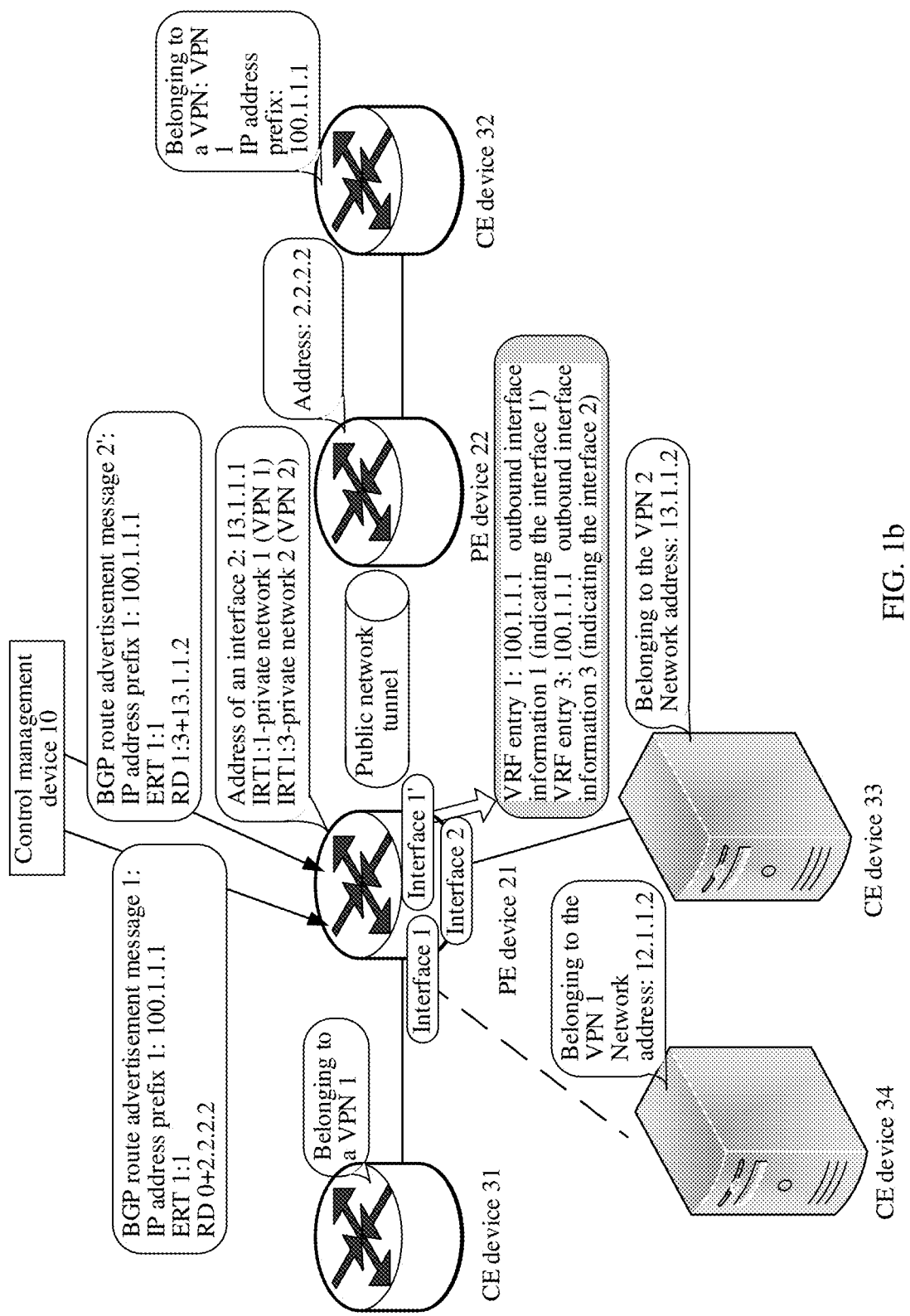
FIG. 1b is a schematic diagram of a network framework involved in another application scenario according to an embodiment of this application.

In addition, on the basis of the network shown in FIG. 1a, a CE device 33 belonging to a VPN 2 may be further included. The CE device 33 is connected to a PE device 21. Details are shown in FIG. 1b. In a network shown in FIG. 1b, the CE device 33 may be, for example, a traffic cleaning server configured for PE devices connected to a plurality of private networks. An RD included in BGP route advertisement message 2' sent by the control management device 10 is 1:3, an ERT is 1:1, and a network address of next hop field may be 00000001000000030D010102, that is, RD 1:3+a network address 13.1.1.2 of the CE device 33. The RD of 1:3 may be used as indication information 1' in the BGP route advertisement message 2'. On the PE device 21, an RD corresponding to the VPN 1 is equal to IRT=1:1, and an RD corresponding to the VPN 2 is equal to IRT=1:3. The PE device 21 further stores a correspondence between the IRT and a private network, for example, may include: a correspondence between IRT of 1:1 and the VPN 1, and a correspondence between the IRT of 1:3 and the VPN 2. After receiving the BGP route advertisement message 2', the PE device 21 may parse the BGP route advertisement message 2' to obtain the ERT and the RD. In this case, the PE device 21 may search for a local IRT of 1:1 that matches the ERT of 1:1, to cross the VPN route 2' to the VPN 1 corresponding to the local IRT of 1:1. In addition, the PE device 21 may further subscribe to outbound interface information 3 from the route management module based on the RD of 1:3 and a network address 13.1.1.2 of a next hop in the BGP route advertisement message 2'. In this way, the PE device 21 may generate, in the VPN 1 that is crossed to, a VRF entry 3 including the outbound interface information 3, where the outbound interface information 3 identifies an interface 2 that is of the PE device 21 and that is connected to the CE device 33, for example, may identify an address of the interface 2. That the ERT in the BGP route advertisement message 2' matches the local IRT may mean, for example, that the ERT in the BGP route advertisement message 2 has a same value as the local IRT. It should be noted that, corresponding to a same VPN, the RD and the RT may have a same value, so that the VRF entry 3 can be accurately generated in an inter-VPN scenario. After receiving the BGP route advertisement message 2', the PE device 21 may cross the VPN route 2' to the VPN 1 based on the ERT, then, the PE device 21 matches a VRF table of the VPN 2 based on the value of the RD, searches the VRF table of the VPN 2 for the outbound interface information 3 corresponding to 13.1.1.2, and then adds the VRF entry 3 corresponding to the outbound interface information 3 and the IP address prefix 1 to the VPN 1. In this way, when receiving traffic 3 sent by the CE device 31, the PE device 21 may determine that an interface for receiving the traffic 3 belongs to the VPN 1, and search a VRF table of the VPN 1 for the VRF entry 3 of a same network segment to which the IP address prefix and a destination address of the traffic 3 belong, so that the PE device 21 obtains the outbound interface information 3 in the VRF entry 3, and sends the traffic 3 to the CE device 33 through the interface 2 corresponding to the outbound interface information 3. In other words, for the traffic 3, the PE device 21 searches the VRF table corresponding to the VPN 1, but the outbound interface information 3 in the VRF entry 3 in the VRF table belongs to the VPN 2. It can be learned that based on the technical solutions provided in this embodiment of this application, the VPN route advertised by the control management device 10 can enable the PE device 21 to forward traffic to the private network in an inter-private network scenario, to implement private network redirection forwarding.

In another example, an embodiment of this application is further applicable to a scenario in which a PE device is dual-homed to a destination host. A network shown in FIG. 1c may include: a control management device 10, a PE device 21, a PE device 22, a CE device 31, a CE device 32, a CE device 33, and a CE device 34. The CE device 31 is connected to the CE device 32 through the PE device 21 and the PE device 22 in sequence, the PE device 21 is further connected to the CE device 32 through the CE device 33 and the CE device 34, and the control management device 10 is connected to the PE device 21. The CE device 33 and the CE device 34 may be connected, for example, via a Layer 2 virtual private network (L2VPN for short) private line. A path from the PE device 21 to the CE device 32 through the CE device 33 and the CE device 34 is denoted as a path 1, and a path from the PE device 21 to the CE device 32 through the PE device 22 is denoted as a path 2. The path 2 includes a public network tunnel between the PE device 21 and the PE device 22. Load balancing or active/standby security switchover can be performed on the path 1 and the path 2. Refer to related descriptions of the current technical solution in FIG. 1a. A VPN route 1 advertised by the control management device 10 to the PE device 21 enables the PE device 21 to support to send traffic to the CE device 32 only through the path 2, and the PE device 21 cannot send the traffic to the CE device 32 through the path 1. However, according to the method provided in embodiments of this application, the PE device 21 may include both a VRF entry 1 and a VRF entry 2. In this way, in a load sharing scenario, when receiving traffic 4 sent to the CE device 32, the PE device 21 may separately perform load sharing on the traffic 4 based on the path 1 and the path 2. It can be learned that based on the technical solutions provided in this embodiment of this application, the VPN route advertised by the control management device 10 can enable the PE device 21 not only to perform public network tunnel forwarding, but also to perform private network forwarding, to implement load balancing on received traffic.

Figure 1C:
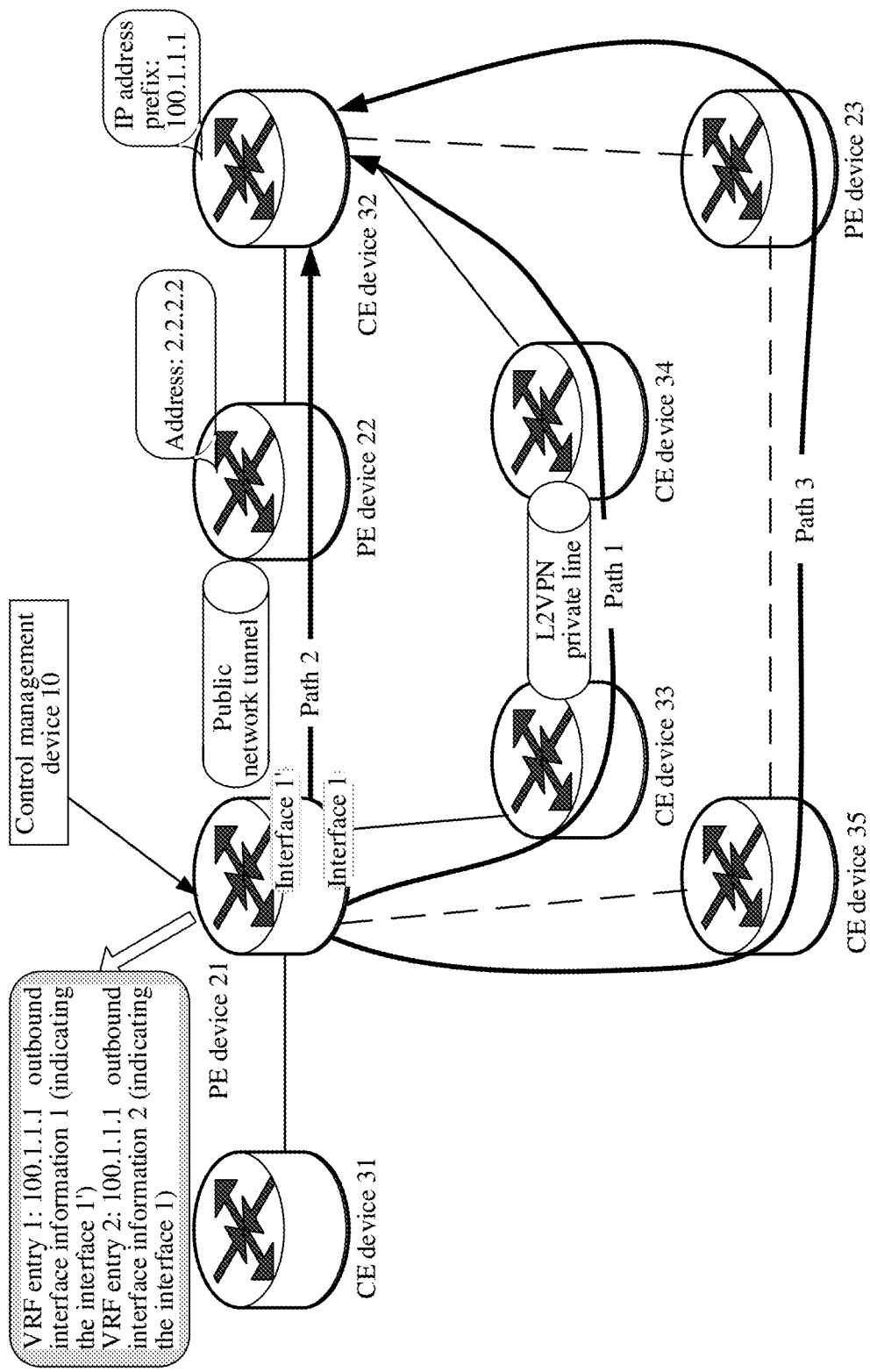
FIG. 1c is a schematic diagram of a network framework involved in still another application scenario according to an embodiment of this application.

In the network shown in FIG. 1c, the path 1 and the path 2 may alternatively be used as paths for active/standby security switchover to implement fault protection. For example, the path 2 is an active path, and the path 1 is a standby path. In a case in which both paths are normal, the path 2 is used as a working path. The PE device 21 may send received traffic 5 to the PE device 22 through the public network tunnel based on an interface 1' corresponding to outbound interface information 1 in the VRF entry 1. Then, the PE device 22 forwards the traffic 5 to the CE device 32, in other words, the PE device 21 sends the traffic 5 based on the path 2. If the path 2 is faulty, the PE device 21 may use the standby path (that is, the path 1) as the working path. In this case, the PE device 21 sends the received traffic 5 to the CE device 33 based on an interface 1 corresponding to outbound interface information 2 in the VRF entry 2. Then, the CE device 33 sends the traffic 5 to the CE device 32 through the CE device 34, in other words, the PE device 21 sends the traffic 5 based on the path 1. It should be noted that, an implementation in which the PE device 21 uses the standby path as the working path may include: setting the VRF entry 1 to an ineffective state, or setting a priority of the VRF entry 2 to be higher than a priority of the VRF entry 1. It can be learned that based on the technical solutions provided in this embodiment of this application, in some fault scenarios, when a public network route is unavailable and there is no backup public network route, the PE device may forward traffic to a destination address based on a private network route, to implement route redirection based on the private network route, avoid service interruption, and improve network reliability.

It should be noted that, referring to FIG. 1c, the network may further include a path 3, where the path 3 is a path through which the PE device 21 is connected to the CE device 32 through a CE device 35 and a PE device 23 in sequence. When the network includes at least two of the path 1, the path 2, and the path 3, for example, includes the path 2 and the path 3, includes the path 1 and the path 3, or includes the path 1, the path 2, and the path 3, load sharing or active/standby security switchover can be implemented in a scenario in which the PE device 21 is homed to the CE device 32 through a plurality of paths.

In still another example, an embodiment of this application is further applicable to an inter-domain interconnection network scenario. A network shown in FIG. 1d may include a control management device 10, a PE device 21, and a PE device 22, and may further include a PE device 23 and a PE device 24. The PE device 23 and the PE device 21 belong to a first domain, and the PE device 22 and the PE device 24 belong to a second domain. A path 4 for direct connection between the PE device 21 and the PE device 22 through a private network interface 1 and a path 5 for direct connection between the PE device 21 and the PE device 22 through a public network interface 1' are included. It should be noted that, no device may be included between the PE device 21 and the PE device 22, or another device that is not sensed by the PE device 21 and the PE device 22 may be included. In this case, regardless of whether another device is included between the PE device 21 and the PE device 22, it may be considered that the PE device 21 and the PE device 22 are directly connected devices. Refer to related descriptions of the current technical solution in FIG. 1a. A VPN route 1 advertised by the control management device 10 to the PE device 21 may enable the PE device 21 to support to send traffic to the PE device 22 only through the path 5, and the PE device 21 cannot forward the traffic through the path 4 based on the private network interface 1. However, according to the method provided in embodiments of this application, the PE device 21 may generate a VRF entry 2. In this way, when receiving traffic 6, the PE device 21 may send the traffic 6 to the PE device 22 based on an interface 1 corresponding to outbound interface information 2 in the VRF entry 2. The outbound interface information 2 may be, for example, an address of a private network interface (that is, the interface 1) on the PE device 21. For example, the PE device 21 and the PE device 22 may be an autonomous system boundary router (ASBR for short) 21 and an ASBR 22, and this scenario may be referred to as Option D. In a current Option D scenario, before performing inter-domain traffic forwarding, the ASBR 21 and the ASBR 22 each need to apply for a private network label and send the applied private network label to a peer ASBR. When forwarding traffic to the ASBR 22, the ASBR 21 needs to modify a next hop address to the private network label of the ASBR 22. Similarly, when forwarding traffic to the ASBR 21, the ASBR 22 needs to modify a next hop address to the private network label of the ASBR 21. However, based on the technical solutions provided in this embodiment of this application, the VPN route 2 advertised by the control management device 10 can enable the PE device 21 to directly forward traffic to the PE device 22 in another domain through the private network interface 1 based on the VRF entry 2. The PE device 21 does not need to apply for the private network label, and does not need to perform private network label switching (that is, change a next hop address to the private network label of the PE device 22) during inter-domain forwarding. This reduces private network label resources and label switching workload.

It should be noted that, in embodiments of this application, the PE device may be a network device such as a switch, a router, or a firewall. The CE device may be a device having a private network access function, for example, may be a device such as a switch, a router, an Internet of Things (IoT for short) terminal, or a host. The control management device may be a device that has a BGP function, supports a VPNv4 address family, a VPNv6 address family, or an L3EVPN address family, and has a control management function for the PE device. For example, the control management device may be an independent communication device (for example, an independent server). For another example, the control management device may alternatively be a functional module integrated into another communication device (for example, may be a newly added service board on the PE device 21). For still another example, the control management device may alternatively be a functional module integrated in public cloud. This is not specifically limited in embodiments of this application.

The foregoing uses the scenarios shown in FIG. 1a, FIG. 1b, FIG. 1c, and FIG. 1d as examples to respectively describe application of the technical solutions in embodiments of this application in different network scenarios. The scenarios are merely examples of several scenarios provided in embodiments of this application, and do not constitute a limitation on embodiments of this application.

The following describes a traffic control method provided in embodiments of this application with reference to the accompanying drawings.

Figure 3:
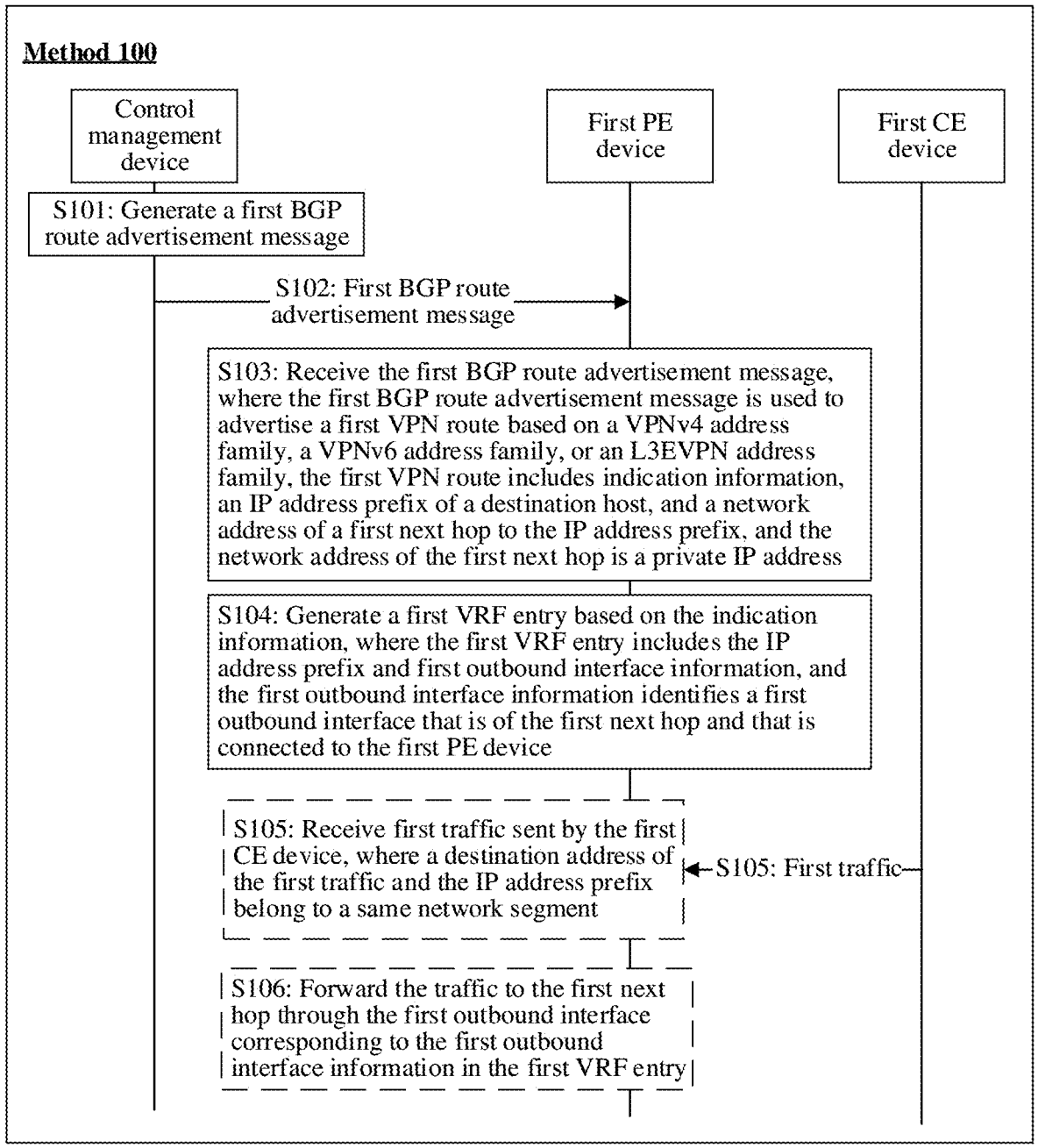
FIG. 3 is a schematic flowchart of a traffic control method 100 according to an embodiment of this application.

FIG. 3 is a schematic flowchart of a traffic control method 100 according to an embodiment of this application. The method 100 is described through interaction between a control management device and a first PE device. For example, the control management device in the method 100 may be the control management device 10 in FIG. 1a, FIG. 1b, or FIG. 1c, and the first PE device may be the PE device 21 in FIG. 1a, FIG. 1b, FIG. 1c, or FIG. 1d. Refer to FIG. 3. The method 100 may include, for example, S101 to S104.

S101: The control management device generates a first BGP route advertisement message.

S102: The control management device sends the first BGP route advertisement message to the first PE device.

S103: The first PE device receives the first BGP route advertisement message sent by the control management device, where the first BGP route advertisement message is used to advertise a first VPN route based on a VPNv4 address family, a VPNv6 address family, or an L3EVPN address family, the first VPN route includes indication information, an IP address prefix of a destination host, and a network address of a first next hop of the IP address prefix, and the network address of the first next hop is a private IP address.

The first BGP route advertisement message may be a VPN packet generated by the control management device and sent to the first PE device. The VPN packet may be a control packet based on the VPNv4 address family, may be a control packet based on the VPNv6 address family, or may be a control packet based on the L3EVPN address family. Corresponding to the scenarios shown in FIG. 1a, FIG. 1c, and FIG. 1d, the first BGP route advertisement message corresponds to the BGP route advertisement message 2, the indication information corresponds to the indication information 1, the network address of the first next hop corresponds to 12.1.1.2, and the IP address prefix of the destination host corresponds to the IP address prefix 1. Corresponding to the scenario shown in FIG. 1b, the first BGP route advertisement message corresponds to the BGP route advertisement message 2', the indication information corresponds to the indication information 1', the network address of the first next hop corresponds to 13.1.1.2, and the IP address prefix of the destination host corresponds to the IP address prefix 1. If the CE device 32 is a network device such as a switch or a router, the destination host is a host directly connected to the CE device 32. If the CE device 32 is a host, the destination host is the CE device 32.

Currently, in RFC 4364, it is defined that a value of an 8-byte RD in a VPN route is 0. After the first PE device receives the VPN route, the first PE device may subscribe to second outbound interface information from a tunnel management module based on the network address of the next hop (that is, an address of a second PE device connected to the first PE device through a public network tunnel), and generate a second VRF entry including the second outbound interface information, where the second outbound interface information indicates a second outbound interface that is of the first PE device and that corresponds to the public network tunnel, so that the first PE device forwards received traffic through the second outbound interface over the public network tunnel based on the second outbound interface information in the second VRF entry. For a specific implementation, refer to related descriptions of S201 to S204 in the following method 200.

In this application, the network address of the first next hop in the first BGP route advertisement message may indicate a next hop of the first PE device after the first VPN route is only crossed to a private network. The next hop of the first PE device after the first VPN route is crossed to the private network is denoted as the first next hop in this embodiment. If the first PE device is the PE device 21, corresponding to the network shown in FIG. 1a, the first next hop may be the CE device 34, the first next hop may be, for example, the traffic cleaning server, and the network address of the first next hop may be the address 12.1.1.2 of the CE device 34. Corresponding to the network shown in FIG. 1b, the first next hop may be the CE device 33, and the network address of the first next hop may be the address 13.1.1.2 of the CE device 33. Corresponding to the network shown in FIG. 1c, the first next hop may be the CE device 33 (or the CE device 35), and the network address of the first next hop may be the address of the CE device 33 (or the CE device 35). Corresponding to the network shown in FIG. 1d, the first next hop may be the PE device 22, and the network address of the first next hop may be an address of the private network interface 1 of the PE device 22.

The IP address prefix of the destination host in the first BGP route advertisement message indicates the destination host, and the IP address prefix and an IP address of the destination host belong to a same network segment. The destination host may be a CE device or a host connected to the CE device. If the first PE device is the PE device 21, corresponding to the networks shown in FIG. 1a and FIG. 1b, a device corresponding to the IP address prefix may be the CE device 32 or the host directly connected to the CE device 32. Corresponding to the network shown in FIG. 1c, a device corresponding to the IP address prefix may be the CE device 32 or the host directly connected to the CE device 32. Corresponding to the network shown in FIG. 1d, a device corresponding to the IP address prefix may be a CE device connected to the PE device 24 or a host directly connected to the CE device.

In a case, the indication information in the first BGP route advertisement message may indicate that the network address of the first next hop is the private IP address, or may indicate that the first VPN route advertised by the first BGP route advertisement message is a private network route. In another case, the indication information may alternatively indicate the first PE device to determine, in a local VRF table, first outbound interface information to the first next hop, where the first outbound interface information identifies a first outbound interface that is of the first PE device and that is connected to the first next hop. It should be noted that, provided that the first PE device can identify the indication information after receiving the first BGP route advertisement message, and generate a first VRF entry based on the indication information, a manner of carrying the indication information is not limited in this embodiment of this application.

In an example, the indication information may be an RD of a non-zero value carried in a network address of next hop field (which may also be referred to as a next hop address field), and is distinguished from an RD with a value of 0 in a current VPN route that guides crossing to the public network tunnel. In this way, after receiving the first BGP route advertisement message, the first PE device may parse the network address of next hop field in MP_REACH_NLRI, to obtain the indication information and the network address of the first next hop, so that it is possible for the first PE device to quickly process the first VPN route. In a case, if the destination host and the first next hop belong to a same VPN, a value of an RD field may be any non-zero value. In another case, if the destination host and the first next hop belong to different VPNs, the value of an RD field may be of a non-zero value used to identify a VPN to which the first next hop belongs. For example, in FIG. 1b, the CE device 33 belongs to the VPN 2, but the CE device 32 and the CE device 31 belong to the VPN 1. The RD in the BGP route advertisement message 2' may be 1:3, and the RD of 1:3 corresponds to the VPN 2. In this way, after receiving the BGP route advertisement message 2', the PE device 21 may cross the VPN route 2' to the VPN 1 based on the ERT, then, the PE device 21 matches the VRF table of the VPN 2 based on the value 1:3 of the RD, searches the VRF table of the VPN 2 for the outbound interface information 3 corresponding to 13.1.1.2, and adds the VRF entry 3 corresponding to the outbound interface information 3 and the IP address prefix 1 to the VPN 1.

In another example, the indication information may alternatively be carried in another field. For example, an extended attribute may be added to the first BGP route advertisement message. The extended attribute is used to carry the indication information. When the first BGP route advertisement message received by the first PE device includes the extended attribute, the first PE device may determine that the first BGP route advertisement message includes the indication information. On the contrary, if the first BGP route advertisement message received by the first PE device does not include the extended attribute, the first PE device may determine that the first BGP route advertisement message does not include the indication information.

It can be learned that when the control management device determines that traffic needs to be controlled to perform private network redirection forwarding on the first PE device, S101 and S102 may be performed. In this case, the first PE device can receive the first BGP route advertisement message based on S103, so that the first PE device can complete, based on S104, preparation for forwarding the traffic, to prepare for performing private network redirection forwarding on the traffic when subsequently receiving the traffic.

S104: The first PE device generates the first VRF entry based on the indication information, where the first VRF entry includes the IP address prefix and the first outbound interface information, and the first outbound interface information identifies a first outbound interface that is of the first PE device and that is connected to the first next hop.

During specific implementation, for example, S104 may include: S1041: The first PE device parses the received first BGP route advertisement message to obtain the indication information and the network address of the first next hop. S1042: The first PE device determines, in the local VRF table based on the indication information and the network address of the first next hop, the first outbound interface information to the first next hop. S1043: The first PE device generates the first VRF entry based on the IP address prefix and the first outbound interface information. When the indication information indicates that the network address of the first next hop is the private IP address, or indicates that the first VPN route is the private network route, for example, S1042 may include: The first PE device searches for a corresponding private network based on an indication of the indication information, and then subscribes to, in the found private network, the first outbound interface information from a route management module based on the network address of the first next hop. When the indication information instructs the first PE device to determine, in the local VRF table, the first outbound interface information to the first next hop, for example, S1042 may include: The first PE device determines, in the local VRF table based on the indication information, the first outbound interface information to the first next hop. In this way, the first PE device neither needs to pay attention to whether the network address of the first next hop is the private IP address, nor needs to pay attention to whether the first VPN route is the private network route. If the first PE device is the PE device 21 in the foregoing embodiment, corresponding to the embodiment shown in FIG. 1a, FIG. 1c, or FIG. 1d, the first VPN route may be the VPN route 2, the first VRF entry is the VRF entry 2, the first outbound interface information is the outbound interface information 2, and the first outbound interface is the interface 1. Corresponding to the embodiment shown in FIG. 1b, the first VPN route may be the VPN route 2', the first VRF entry is the VRF entry 3, the first outbound interface information is the outbound interface information 3, and the first outbound interface is the interface 2.

If the first next hop and the destination host belong to the same VPN (that is, the first VPN), S104 may specifically include: The first PE device determines a local RT (that is, an IRT) that matches the RT (which may also be referred to as an ERT) in the first BGP route advertisement message, and crosses the first VPN route advertised by the first BGP route advertisement message into a private network corresponding to the local RT. Then, the first PE device subscribes to, from the route management module based on the network address of the first next hop in the first BGP route advertisement message, the first outbound interface information to the first next hop, so that the first PE device generates, in the private network that is crossed to, the first VRF entry including the first outbound interface information. The first PE device may pre-store correspondences between different RTs and private networks, and each private network maintains a VRF table thereof. That the RT in the first BGP route advertisement message matches the local RT, for example, may mean that the RT in the first BGP route advertisement message has a same value as the local RT.

If the first next hop and the destination host belong to different VPNs, S104 may specifically include: The first PE device determines a local IRT that matches the ERT in the first BGP route advertisement message, and crosses the first VPN route advertised by the first BGP route advertisement message into a private network corresponding to the local IRT. Then, the first PE device subscribes to, from the route management module based on the RD in the first BGP route advertisement message and the network address of the first next hop, the first outbound interface information to the first next hop, so that the first PE device generates, in the private network that is crossed to, the first VRF entry including the first outbound interface information. It is assumed that the first next hop belongs to a second VPN, the destination host belongs to the first VPN, an IRT corresponding to the first VPN is an IRT 1 and an RD is an RD 1, an IRT corresponding to the second VPN is an IRT 2 and an RD is an RD 2, and the first PE device stores a correspondence between the IRT 1 and a private network 1 and a correspondence between the IRT 2 and a private network 2. If the ERT included in the first BGP route advertisement message matches the IRT 1, but the RD included in the first BGP route advertisement message identifies the first next hop in the private network 2, the first PE device may cross the first VPN route to the private network 1 based on the first BGP route advertisement message, but in the first VRF entry generated in the private network 1, the first outbound interface information identifies the first outbound interface of the first PE device to the first next hop in the private network 2. That the first PE device subscribes to, from the route management module based on the RD in the first BGP route advertisement message and the network address of the first next hop, the first outbound interface information reaching the first next hop, for example, means: The first PE device matches a VRF table of the second VPN based on the value of the RD in the first BGP route advertisement message, searches the VRF table of the second VPN for the first outbound interface information corresponding to the network address of the first next hop, and then adds the first VRF entry corresponding to the first outbound interface information and the IP address prefix to the first VPN corresponding to the destination host.

If the first PE device is the PE device 21, the first outbound interface information identifies the first outbound interface that is on the PE device 21 and that is connected to the first next hop. Corresponding to the network shown in FIG. 1a, the first outbound interface information may identify the interface 1 that is on the PE device 21 and that is connected to the CE device 34. For example, the first outbound interface information may be an address of the interface 1 that is on the PE device 21 and that is connected to the CE device 34, or may be an address of the interface that is on the CE device 34 and that is connected to the PE device 21. The addresses of the two interfaces belong to a same network segment, and may both identify the interface 1 on the PE device 21. Corresponding to the network shown in FIG. 1b, the first outbound interface information may identify the interface 2 that is on the PE device 21 and that is connected to the CE device 33. For example, the first outbound interface information may be the address of the interface 2 that is on the PE device 21 and that is connected to the CE device 33. Corresponding to the network shown in FIG. 1c, the first outbound interface information may identify the interface 1 that is on the PE device 21 and that is connected to the CE device 33 (or an interface that is on the PE device 21 and that is connected to the CE device 35). For example, the first outbound interface information may be an address of the interface that is on the PE device 21 and that is connected to the CE device 33 (or the CE device 35). Corresponding to the network shown in FIG. 1d, the first outbound interface information may identify the private network interface 1 that is on the PE device 21 and that is connected to the PE device 22. For example, the first outbound interface information may be the address of the private network interface 1 that is on the PE device 21 and that is connected to the PE device 22.

In this way, according to the method provided in this embodiment of this application, the first PE device has a function of forwarding, from the first outbound interface to the first next hop, traffic whose destination address matches the IP address prefix in the first VRF entry. In this case, after S104, the method 100 may further include:

S105: The first PE device receives first traffic sent by a first CE device, where a destination address of the first traffic and the IP address prefix belong to a same network segment.

S106: The first PE device forwards the first traffic to the first next hop through the first outbound interface.

During specific implementation, after receiving the first traffic, the first PE device may first parse the first traffic to obtain the destination address of the first traffic, and search the VRF table based on the destination address. When the first PE device determines that the destination address of the first traffic and an IP address prefix in a first VRF entry in the VRF table belong to the same network segment (that is, the destination address of the first traffic matches the IP address prefix in the first VRF entry), the first PE device obtains the first outbound interface information in the first VRF entry, to forward the first traffic from a first outbound interface corresponding to the first outbound interface information to the first next hop, so that the first PE device implements private network redirection forwarding on the first traffic. If the first PE device is the PE device 21 in the foregoing embodiment, corresponding to the embodiment shown in FIG. 1a, the first VRF entry is the VRF entry 2, the first outbound interface is the interface 1, and the first traffic is the traffic 2.

It should be noted that, in a scenario in which the first next hop and the destination host belong to different VPNs, the first VRF entry belongs to a VPN instance corresponding to the destination host, but the first outbound interface information in the first VRF entry indicates a first outbound interface of a first next hop that is connected to the first PE device and that belongs to another VPN instance.

Figure 1D:
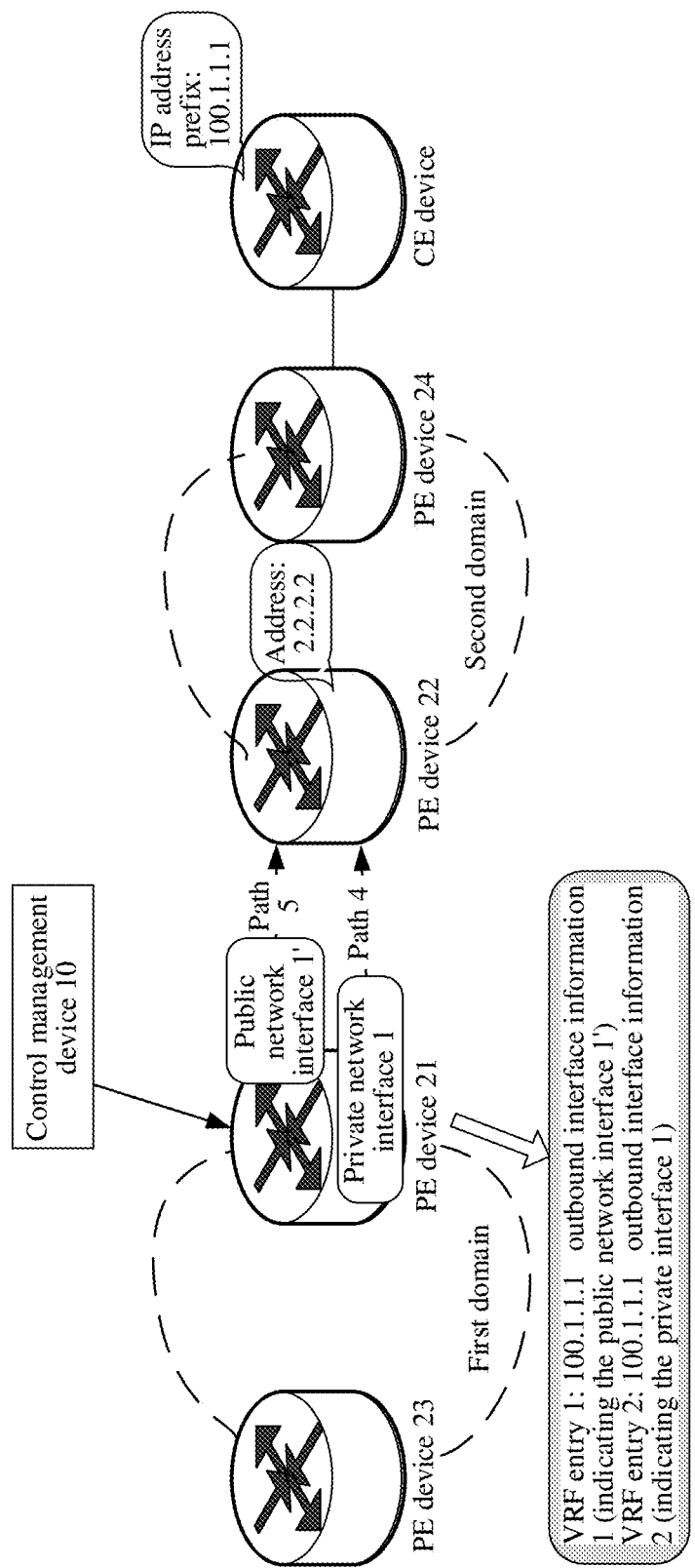
FIG. 1d is a schematic diagram of a network framework involved in yet another application scenario according to an embodiment of this application.

For another example, in the scenario shown in FIG. 1d, if the first PE device is a first ASBR, and the first next hop is a second ASBR, the first ASBR reaches the IP address prefix via the second ASBR. A first path and a second path are included between the first ASBR and the second ASBR, where the first path is connected through a private network interface, the second path is connected through a public network interface, and the first outbound interface information is the private network interface that is of the first ASBR and that is connected to the second ASBR. In this case, after S104, the method may further include the following steps:

S105': The first ASBR receives fifth traffic, where a destination address of the fifth traffic and the IP address prefix belong to a same network segment.

S106': The first ASBR forwards the fifth traffic to the second ASBR through the first outbound interface.

During specific implementation, after receiving the fifth traffic, the first ASBR may first parse the fifth traffic to obtain the destination address of the fifth traffic, and search the VRF table based on the destination address. When determining that the destination address of the fifth traffic and the IP address prefix in the first VRF entry in the VRF table belong to the same network segment, the first ASBR obtains the first outbound interface information of the first VRF entry, to forward the fifth traffic from the first outbound interface (that is, the private network interface on the first path) corresponding to the first outbound interface information to the second ASBR, to implement forwarding of the fifth traffic on the first ASBR. In this way, the ASBR does not need to apply for a private network label or exchange a private network label during inter-domain forwarding. This saves resources required for private network label allocation and private network label switching on the ASBR. If the first PE device is the PE device 21 in the foregoing embodiment, corresponding to the embodiment shown in FIG. 1d, the first VRF entry is the VRF entry 2, the first outbound interface is the interface 1 (that is, the private network interface), and the first traffic is the traffic 6.

It can be learned that, according to the method 100, the control management device includes the indication information in the VPN route advertised by using the VPNv4 address family, the VPNv6 address family, or the L3EVPN address family, to indicate the PE device to redirect the VPN route to iterate to a next hop of the private network, so that the control management device sends the VPN route to the PE device in a lightweight and flexible manner, and the PE device generates, based on the private network VPN route, a VRF entry for controlling traffic forwarding. This overcomes a problem that currently, the VPN route advertised by the control management device to the PE device can only support to be iterated to a public network tunnel, so that the PE device can only support to forward received traffic through the public network tunnel, and cannot support a function of private network redirection forwarding.

In some possible implementations, to adapt to requirements of more network scenarios, in addition to the method 100, the traffic control method provided in embodiments of this application may further include the following method 200. In the method 200, a control management device may advertise, to a first PE device, a second VPN route that supports iteration of traffic to a public network tunnel, so that the first PE device has a function of forwarding through the public network tunnel. The control management device in the method 200 may be the control management device 10 in FIG. 1a, FIG. 1b, FIG. 1c, or FIG. 1d, the first PE device may be the PE device 21 in FIG. 1a, FIG. 1b, FIG. 1c, or FIG. 1d, and a second PE device may be the PE device 22 in FIG. 1a, FIG. 1b, FIG. 1c, or FIG. 1d.

It should be noted that the method 100 and the method 200 may be performed successively, or may be performed simultaneously, and may exist separately, or may exist as an entire embodiment. This is not limited in embodiments of this application.

Figure 4:
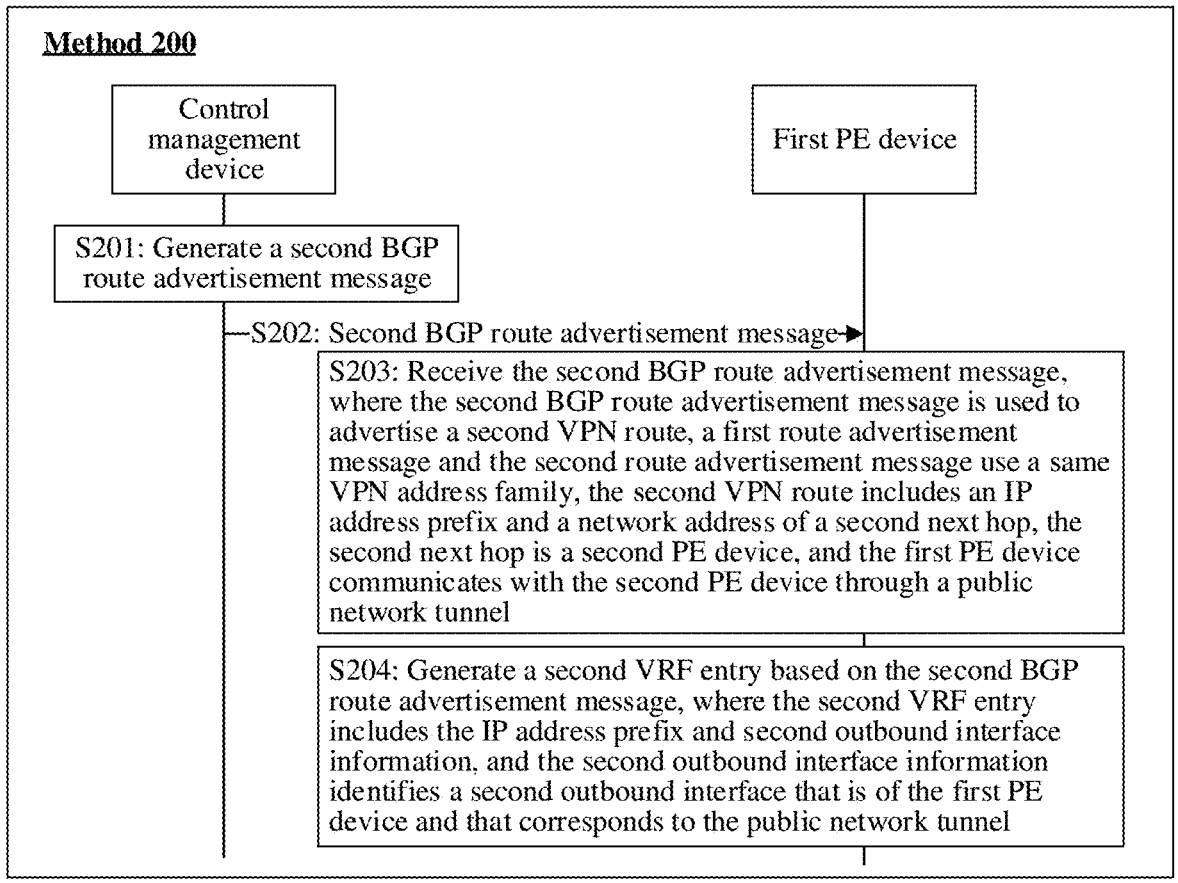
FIG. 4 is a schematic flowchart of another traffic control method 200 according to an embodiment of this application.

Refer to FIG. 4. The method 200 may include, for example, the following steps S201 to S204.

S201: The control management device generates a second BGP route advertisement message.

S202: The control management device sends the second BGP route advertisement message to the first PE device.

S203: The first PE device receives the second BGP route advertisement message sent by the control management device, where the second BGP route advertisement message is used to advertise the second VPN route, a first BGP route advertisement message and the second BGP route advertisement message use a same VPN address family, the second VPN route includes an IP address prefix and a network address of a second next hop to the IP address prefix, the second next hop is the second PE device, and the first PE device communicates with the second PE device through the public network tunnel.

The second BGP route advertisement message may be a VPN packet generated by the control management device and sent to the first PE device. The VPN packet may be a control packet based on a VPNv4 address family, may be a control packet based on a VPNv6 address family, or may be a control packet based on an L3EVPN address family. Corresponding to the scenarios shown in FIG. 1a to FIG. 1c, a format of the second BGP route advertisement message corresponds to the BGP route advertisement message 1, where a value of an RD in a next hop address field may be, for example, the value of the RD being all zeros shown in FIG. 2a, the second next hop is the PE device 22, the network address of the second next hop may correspond to the address 2.2.2.2 of the PE device 22, and the IP address prefix corresponds to the IP address prefix 1.

During specific implementation, when the control management device determines that traffic needs to be controlled to perform public network tunnel forwarding on the first PE device, S201 and S202 may be performed. In this case, the first PE device can receive the second BGP route advertisement message based on S203, so that the second PE device can complete, based on S204, preparation for forwarding the traffic, to prepare for forwarding the traffic through the public network tunnel when subsequently receiving the traffic.

S204: The first PE device generates a second VRF entry based on the second BGP route advertisement message, where the second VRF entry includes the IP address prefix and second outbound interface information, and the second outbound interface information identifies a second outbound interface that is of the first PE device and that corresponds to the public network tunnel.

The first PE device enters the public network tunnel through the second outbound interface identified by the second outbound interface information.

During specific implementation, for example, S204 may include: S2041: The first PE device parses the received second BGP route advertisement message to obtain the second IP address prefix and a network address of a second next hop. S2042: The first PE device determines the second outbound interface information in a local VRF table. S2043: The first PE device determines the second VRF entry based on the IP address prefix and the second outbound interface information. If the first PE device is the PE device 21 in the foregoing embodiment, and the second PE device (that is, the second next hop) is the PE device 22, corresponding to the embodiment shown in FIG. 1a, FIG. 1b, FIG. 1c, or FIG. 1d, the second VPN route may be the VPN route 1, the second VRF entry is the VRF entry 1, the second outbound interface information is the outbound interface information 1, and the second outbound interface is the interface 1'. Corresponding to the networks shown in FIG. 1a and FIG. 1b, the network address of the second next hop may be the address of the PE device 22. Corresponding to the network shown in FIG. 1c, the network address of the second next hop may be the address of the PE device 22. Corresponding to the network shown in FIG. 1d, the network address of the second next hop may be an address of the public network interface 1' on the PE device 22.

In this way, according to the method provided in this embodiment of this application, the first PE device has a function of forwarding, through the public network tunnel, traffic whose destination address matches the IP address prefix in the second VRF entry. Then, after S204, the method 200 may further include an operation of forwarding, through the public network tunnel, the traffic whose destination address matches the IP address prefix.

In an example, if the first PE device supports to forward the received traffic separately through the private network and the public network tunnel after copying the received traffic, after S104 and S204, the method may further include:

S305: The first PE device receives and copies second traffic sent by a second CE device, to obtain third traffic.

S306: The first PE device forwards the second traffic to the first next hop through the first outbound interface.

S307: The first PE device forwards the third traffic to the second PE device through the second outbound interface.

During specific implementation, after receiving the second traffic sent by the second CE device, the first PE device may copy the second traffic to obtain the third traffic that is the same as the second traffic; or may parse the second traffic (or the third traffic) to obtain a destination address of the received traffic, and search the VRF table based on the destination address. In an aspect, the first PE device determines that the destination address of the received traffic and the IP address prefix in the first VRF entry in the VRF table belong to a same network segment, obtains the first outbound interface information of the first VRF entry based on S306, and forwards either the second traffic or the third traffic from the first outbound interface corresponding to the first outbound interface information to the first next hop, to implement private network redirection forwarding on the traffic on the first PE device. In another aspect, the first PE device determines that the destination address of the received traffic and the IP address prefix in the second VRF entry of the VRF table belong to the same network segment, obtains the second outbound interface information of the second VRF entry based on S307, and forwards either the second traffic or the third traffic to the second next hop (that is, the second PE device) through the public network tunnel indicated by the second outbound interface, to implement forwarding of the traffic on the first PE device through the public network tunnel.

It should be noted that the second CE device and the first CE device in the method 100 may be a same CE device. For example, both the first CE device and the second CE device correspond to the CE device 31 in FIG. 1a. Alternatively, the second CE device and the first CE device in the method 100 may be two different CE devices connected to the first PE device.

For another example, if a first path and a second path are included between the first PE device and the destination host, where the first path includes the first next hop, and the second path includes the second next hop, the method may be applied to the network scenario shown in FIG. 1c, to implement load sharing or active/standby security switchover. Using load sharing as an example, after S104 and S204, the method may further include:

S305': The first PE device receives fourth traffic sent by a third CE device.

S306': The first PE device performs load sharing on the fourth traffic through the first path and the second path.

During specific implementation, after receiving the fourth traffic sent by the third CE device, the first PE device may split the fourth traffic into first sub-traffic and second sub-traffic based on an actual network condition (for example, a congestion condition on the first path and the second path); or may parse the fourth traffic to obtain a destination address of the fourth traffic, and search the VRF table based on the destination address. In an aspect, the first PE device determines that the destination address of the fourth traffic and the IP address prefix in the first VRF entry belong to the same network segment, obtains the first outbound interface information of the first VRF entry, and forwards the first sub-traffic from the first outbound interface to the first next hop. In another aspect, the first PE device determines that the destination address of the fourth traffic and the IP address prefix in the second VRF entry belong to the same network segment, obtains the second outbound interface information of the second VRF entry, and forwards the second sub-traffic from the public network tunnel to the second next hop.

If the destination host is the CE device 32 in FIG. 1c, the second next hop is the PE device 22. After receiving the second sub-traffic, the PE device 22 further needs to send the second sub-traffic to the CE device 32. The first next hop is the CE device 33 (or the CE device 35), and after receiving the first sub-traffic, the CE device 33 (or the CE device 35) further needs to send the first sub-traffic to the CE device 32.

It should be noted that the third CE device and the first CE device in the method 100 may be a same CE device. For example, both the first CE device and the third CE device correspond to the CE device 31 in FIG. 1a. Alternatively, the third CE device and the first CE device in the method 100 may be two different CE devices connected to the first PE device.

It can be learned that, according to the method provided in embodiments of this application, the control management device may advertise the VPN route to the PE device, so that the PE device has the function of private network redirection forwarding, or the control management device may advertise, to the PE device, a VPN route that supports only iteration of traffic to the public network tunnel, so that the PE device has the function of forwarding through the public network tunnel. In this way, lightweight and flexible control on the PE device by the control management device is implemented, and compatibility of a plurality of different network scenarios is also implemented.

Figure 5:
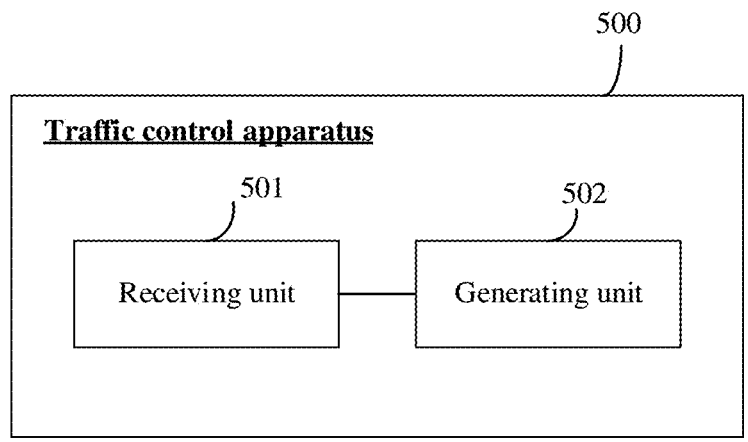
FIG. 5 is a schematic diagram of a structure of a traffic control apparatus 500 according to an embodiment of this application.

In addition, an embodiment of this application further provides a traffic control apparatus 500, as shown in FIG. 5. FIG. 5 is a schematic diagram of a structure of the traffic control apparatus 500 according to an embodiment of this application. The traffic control apparatus 500 is used in a first PE device, and the apparatus 500 includes a receiving unit 501 and a generating unit 502. The apparatus 500 may be configured to perform the method 100 or the method 200 in the foregoing embodiments.

The receiving unit 501 is configured to receive a first border gateway protocol BGP route advertisement message sent by a control management device, where the first BGP route advertisement message is used to advertise a first VPN route based on a virtual private network version 4 VPNv4 address family, a virtual private network version 6 VPNv6 address family, or a Layer 3 Ethernet virtual private network L3EVPN address family, the first VPN route includes indication information, an IP address prefix of a destination host, and a network address of a first next hop to the IP address prefix, and the network address of the first next hop is a private IP address.

The generating unit 502 is configured to generate a first virtual routing and forwarding VRF entry based on the indication information, where the first VRF entry includes the IP address prefix and first outbound interface information, and the first outbound interface information identifies a first outbound interface that is of the first PE device and that is connected to the first next hop.

For a specific implementation of performing an operation by the receiving unit 501 and achieved effects, refer to related descriptions of S103 in the method 100. For a specific implementation of performing an operation by the generating unit 502 and achieved effects, refer to related descriptions of S104 in the method 100.

In an implementation, the generating unit 502 may include a first determining subunit and a first generating subunit. The first determining subunit is configured to determine, in a local VRF table based on the indication information and the network address of the first next hop, the first outbound interface information to the first next hop. The first generating subunit is configured to generate the first VRF entry based on the IP address prefix and the first outbound interface information.

In an implementation, the first BGP route advertisement message includes a next hop address field, the indication information is a route distinguisher RD included in the next hop address field, and the RD is of a non-zero value. For example, the RD identifies a VPN to which the first next hop belongs.

In an implementation, the first next hop is a traffic cleaning server.

In an implementation, the destination host and the first next hop may belong to a same VPN. Alternatively, the destination host and the first next hop may belong to different VPNs.

In an implementation, the receiving unit 501 in the apparatus 500 is further configured to receive first traffic sent by a first customer edge CE device, where a destination address of the first traffic and the IP address prefix belong to a same network segment. The apparatus 500 may further include a first sending unit, configured to forward the first traffic to the first next hop through the first outbound interface. For a specific implementation of performing an operation by the receiving unit 501 and achieved effects in this implementation, refer to related descriptions of S105 in the method 100. For a specific implementation of performing an operation by the first sending unit and achieved effects, refer to related descriptions of S106 in the method 100.

In an implementation, the receiving unit 501 in the apparatus 500 is further configured to receive a second BGP route advertisement message sent by the control management device, where the second BGP route advertisement message is used to advertise a second VPN route, and the first BGP route advertisement message and the second BGP route advertisement message use a same VPN address family. The second VPN route includes the IP address prefix and a network address of a second next hop to the IP address prefix, the second next hop is a second PE device, and the first PE device communicates with the second PE device through a public network tunnel. The generating unit 502 is further configured to generate a second VRF entry based on the second BGP route advertisement message, where the second VRF entry includes the IP address prefix and second outbound interface information, and the second outbound interface information identifies a second outbound interface that is of the first PE device and that corresponds to the public network tunnel. For a specific implementation of performing an operation by the receiving unit 501 and achieved effects in this implementation, refer to related descriptions of S203 in the method 200. For a specific implementation of performing an operation by the generating unit 502 and achieved effects, refer to related descriptions of S204 in the method 200.

In an implementation, the generating unit 502 may further include a second determining subunit and a second generating subunit. The second determining subunit is configured to determine the second outbound interface information in the local VRF table. The second generating subunit is configured to generate the second VRF entry based on the IP address prefix and the second outbound interface information.

In an implementation, the receiving unit 501 in the apparatus 500 is further configured to receive second traffic sent by a second CE device. In this case, the apparatus 500 may further include a copying unit and a second sending unit. The copying unit is configured to copy the second traffic to obtain third traffic. The second sending unit is configured to forward the second traffic to the first next hop through the first outbound interface. The second sending unit is further configured to forward the third traffic to the second PE device through the second outbound interface. For a specific implementation of performing an operation by the receiving unit 501 and achieved effects in this implementation, refer to related descriptions of S305 in the method 200. For a specific implementation of performing an operation by the copying unit and achieved effects, refer to related descriptions of S305 in the method 200. For a specific implementation of performing an operation by the second sending unit and achieved effects, refer to related descriptions of S306 and S307 in the method 200.

In an implementation, the first PE device is connected to the destination host separately through a first path and a second path, and the first path includes the first next hop. In this case, the receiving unit 501 in the apparatus 500 is further configured to receive fourth traffic sent by a third CE device. The apparatus may further include a third sending unit, where the third sending unit is configured to perform load sharing on the fourth traffic through the first path and the second path. For a specific implementation of performing an operation by the receiving unit 501 and achieved effects in this implementation, refer to related descriptions of S305' in the method 200. For a specific implementation of performing an operation by the third sending unit and achieved effects, refer to related descriptions of S306' in the method 200.

In an implementation, the first PE device is a first ASBR, the first next hop is a second ASBR, a private network interface is included between the first ASBR and the second ASBR, and the first outbound interface is a private network interface that is of the first ASBR and that is connected to the second ASBR. In this case, the receiving unit 501 in the apparatus 500 is further configured to receive fifth traffic, where a destination address of the fifth traffic and the IP address prefix belong to a same network segment. The apparatus 500 further includes a fourth sending unit, where the fourth sending unit is configured to forward the fifth traffic to the second ASBR through the first outbound interface. For a specific implementation of performing an operation by the receiving unit 501 and achieved effects in this implementation, refer to related descriptions of S105' in the method 100. For a specific implementation of performing an operation by the fourth sending unit and achieved effects, refer to related descriptions of S106' in the method 100.

Figure 6:
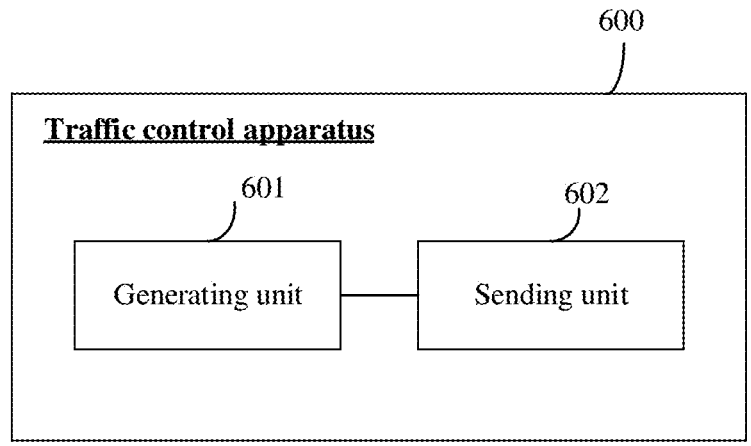
FIG. 6 is a schematic diagram of a structure of a traffic control apparatus 600 according to an embodiment of this application.

In addition, an embodiment of this application further provides a traffic control apparatus 600, as shown in FIG. 6. FIG. 6 is a schematic diagram of a structure of the traffic control apparatus 600 according to an embodiment of this application. The traffic control apparatus 600 is used in a control management device, and the apparatus 600 includes a generating unit 601 and a sending unit 602. The apparatus 600 may be configured to perform the method 100 or the method 200 in the foregoing embodiments.

The generating unit 601 configured to generate a first BGP route advertisement message.

The sending unit 602 is configured to send the first BGP route advertisement message to a first provider edge PE device, where the first BGP route advertisement message is used to advertise a first VPN route based on a virtual private network version 4 VPNv4 address family, a virtual private network version 6 VPNv6 address family, or a Layer 3 Ethernet virtual private network L3EVPN address family, the first VPN route includes indication information, an IP address prefix of a destination host, and a network address of a first next hop to the IP address prefix, the network address of the first next hop is a private IP address, and the indication information instructs the first PE device to generate a first virtual routing and forwarding VRF entry, where the first VRF entry includes the IP address prefix and first outbound interface information, and the first outbound interface information identifies a first outbound interface that is of the first PE device and that is connected to the first next hop.

For a specific implementation of performing an operation by the generating unit 601 and achieved effects, refer to related descriptions of S101 in the method 100. For a specific implementation of performing an operation by the sending unit 602 and achieved effects, refer to related descriptions of S102 in the method 100.

In an implementation, the first BGP route advertisement message includes a next hop address field, the indication information is a route distinguisher RD included in the next hop address field, and the RD is of a non-zero value. For example, the RD identifies a VPN to which the first next hop belongs.

In an implementation, the first next hop is a traffic cleaning server.

In an implementation, the destination host and the first next hop may belong to a same VPN. Alternatively, the destination host and the first next hop may belong to different VPNs.

In an implementation, the generating unit 601 in the apparatus 600 may further configured to generate a second BGP route advertisement message, and the sending unit 602 is further configured to send a second BGP route advertisement message to the first PE device, where the second BGP route advertisement message is used to advertise a second VPN route, and the first BGP route advertisement message and the second BGP route advertisement message use a same VPN address family. The second VPN route includes the IP address prefix and a network address of a second next hop to the IP address prefix, the second next hop is a second PE device, and the first PE device communicates with the second PE device through a public network tunnel. The second BGP route advertisement message instructs the first PE device to generate a second VRF entry, where the second VRF entry includes the IP address prefix and second outbound interface information. The second outbound interface information identifies a second outbound interface that is of the first PE device and that corresponds to the public network tunnel. For a specific implementation of performing an operation by the generating unit 601 and achieved effects in this implementation, refer to related descriptions of S201 in the method 200. For a specific implementation of performing an operation by the sending unit 602 and achieved effects, refer to related descriptions of S202 in the method 200.

Figure 7:
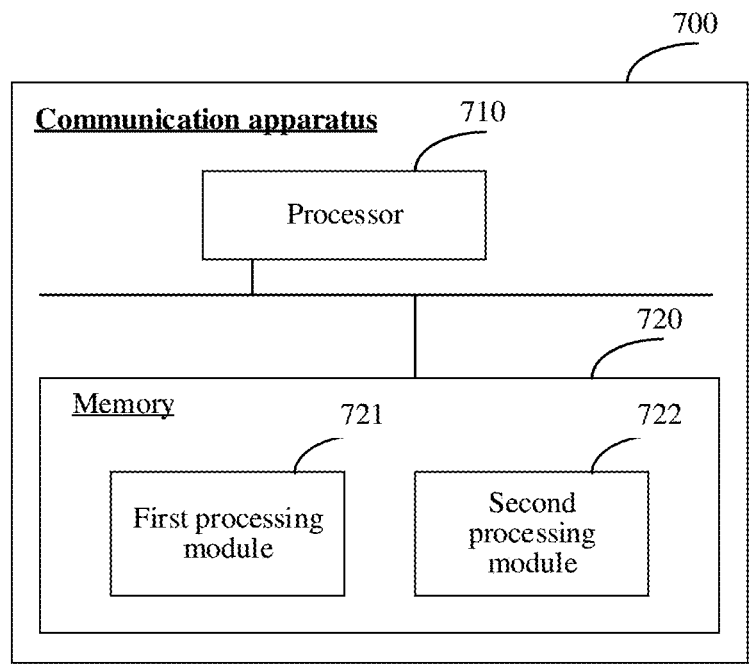
FIG. 7 is a schematic diagram of a structure of a communication apparatus 700 according to an embodiment of this application.

In addition, an embodiment of this application further provides a communication apparatus 700. FIG. 7 is a schematic diagram of a structure of the communication apparatus 700 according to an embodiment of this application. The communication apparatus 700 may be configured to perform the method 100 or the method 200 in the foregoing embodiments.

As shown in FIG. 7, the communication apparatus 700 may include a processor 710 and a memory 720 coupled to the processor 710. The processor 710 may be a central processing unit (CPU for short), a network processor (NP for short), or a combination of a CPU and an NP. Alternatively, the processor may be an application-specific integrated circuit (ASIC for short), a programmable logic device (PLD for short), or a combination thereof. The PLD may be a complex programmable logic device (CPLD for short), a field-programmable gate array (FPGA for short), generic array logic (GAL for short), or any combination thereof. The processor 710 may be one processor, or may include a plurality of processors. The memory 720 may include a volatile memory, for example, a random-access memory (RAM for short), or the memory may include a non-volatile memory, for example, a read-only memory (ROM for short), a flash memory, a hard disk drive (HDD for short), or a solid-state drive (SSD for short). Alternatively, the memory 720 may include a combination of the foregoing types of memories. The memory 720 may be one memory, or may include a plurality of memories. In an implementation, the memory 720 stores computer-readable instructions, and the computer-readable instructions include a plurality of software modules, for example, a first processing module 721 and a second processing module 722. In addition, the computer-readable instructions may further include at least one of a third processing module, a fourth processing module, and a fifth processing module, which may respectively correspond to one functional module in the generating unit 502 in the traffic control apparatus 500, or may correspond to one functional module in the generating unit 601 in the traffic control apparatus 600. After executing each software module, the processor 710 may perform a corresponding operation based on an indication of each software module. In this embodiment, an operation performed by a software module is actually an operation performed by the processor 710 based on an indication of the software module. For example, the "generating a first virtual routing and forwarding VRF entry based on the indication information" executed by the first processing module 721 may actually refer to the "generating a first virtual routing and forwarding VRF entry based on the indication information" executed by the processor 710 based on an instruction of the first processing module 721. In this case, the first processing module 721 may correspond to the generating unit 502 in the communication apparatus 500.

In an example, the communication apparatus 700 may perform the method 100 in the foregoing embodiment. When the communication apparatus 700 is configured to perform the method 100 in the foregoing embodiment, the processor 710 is configured to perform all processing-related operations in the method 100. For example, the processor 710 is configured to generate a first virtual routing and forwarding VRF entry based on the indication information, where the first VRF entry includes an IP address prefix and first outbound interface information, and the first outbound interface information identifies a first outbound interface that is of a first PE device and that is connected to a first next hop.

In an example, the communication apparatus 700 may perform the method 200 in the foregoing embodiment. When the communication apparatus 700 is configured to perform the method 200 in the foregoing embodiment, the processor 710 is configured to perform all processing-related operations in the method 200. For example, the processor 710 is configured to generate a first BGP route advertisement message.

Figure 8:
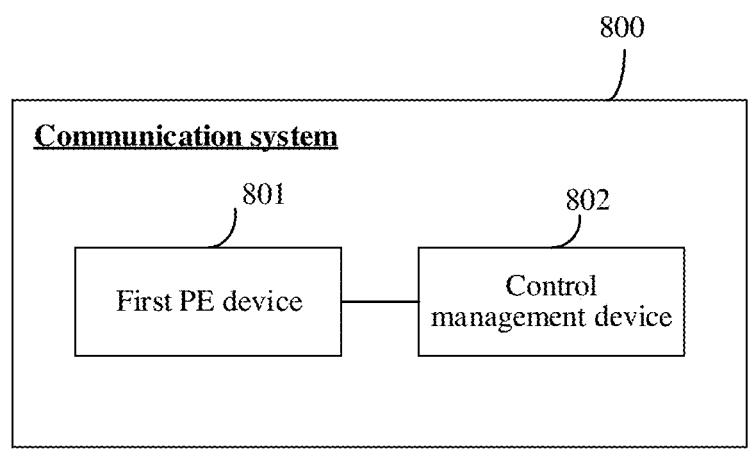
FIG. 8 is a schematic diagram of a structure of a communication system 800 according to an embodiment of this application.

In addition, an embodiment of this application further provides a communication system 800, as shown in FIG. 8. FIG. 8 is a schematic diagram of a structure of the communication system 800 according to an embodiment of this application. The communication system 800 may include a first PE device 801 and a control management device 802.

The first PE device 801 may be, for example, the PE device 21 in FIG. 1a, FIG. 1b, FIG. 1c, or FIG. 1d, and is configured to perform the operations performed by the first PE device in the method 100 and the method 200.

The control management device 802 may be, for example, the control management device 10 in FIG. 1a, FIG. 1b, FIG. 1c, or FIG. 1d, and is configured to perform the operations performed by the control management device in the method 100 and the method 200.

For a specific implementation and achieved effects of the communication system 800, refer to related descriptions of the method 100 and the method 200.

This application further provides a computer-readable storage medium. The computer-readable storage medium stores instructions. When the instructions are run on a computer, the computer is enabled to perform any one or more operations in the method (for example, the method 100 or the method 200) in any one of the foregoing embodiments.

This application further provides a computer program product including a computer program. When the computer program is run on a computer, the computer is enabled to perform any one or more operations in the method (for example, the method 100 or the method 200) in any one of the foregoing embodiments.

In the specification, claims, and accompanying drawings of this application, the terms "first", "second", "third", "fourth", and so on (if existent) are intended to distinguish between similar objects but do not necessarily indicate a specific order or sequence. It should be understood that data used in such a way is interchangeable in proper circumstances, so that embodiments described herein can be implemented in other orders than the order illustrated or described herein. In addition, the terms "include" and "have" and any other variants are intended to cover the non-exclusive inclusion. For example, a process, method, system, product, or device that includes a list of steps or units is not necessarily limited to those expressly listed steps or units, but may include other steps or units not expressly listed or inherent to such a process, method, product, or device.

It may be clearly understood by persons skilled in the art that, for the purpose of convenient and brief description, for a detailed working process of the foregoing system, apparatus, and unit, refer to a corresponding process in the foregoing method embodiments, and details are not described herein again.

In the several embodiments provided in this application, it should be understood that the disclosed system, apparatus, and method may be implemented in other manners. For example, the described apparatus embodiments are merely examples. For example, division into units is merely logical service division and may be another division during actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, in other words, may be located in one position, or may be distributed on a plurality of network units. Some or all of the units may be selected based on actual requirements to achieve the objectives of the solutions of embodiments.

In addition, service units in embodiments of this application may be integrated into one processing unit, or each of the units may exist alone physically, or two or more units may be integrated into one unit. The integrated unit may be implemented in a form of hardware, or may be implemented in a form of a software service unit.

When the integrated unit is implemented in a form of a software service unit and sold or used as an independent product, the integrated unit may be stored in a computer-readable storage medium. Based on such an understanding, the technical solutions of this application essentially, or a part contributing to a conventional technology, or all or some of the technical solutions may be implemented in a form of a software product. The computer software product is stored in a storage medium and includes several instructions for instructing a computer device (which may be a personal computer, a server, a network device, or the like) to perform all or some of the steps of the methods in embodiments of this application. The storage medium includes any medium that can store program code, such as a USB flash drive, a removable hard disk, a read-only memory (ROM, Read-Only Memory), a random access memory (RAM, Random Access Memory), a magnetic disk, or an optical disc.

Persons skilled in the art should be aware that in the foregoing one or more examples, the services described in this application may be implemented by hardware, software, firmware, or any combination thereof. When the services are implemented by using the software, the services may be stored in a computer-readable medium or transmitted as one or more instructions or code in the computer-readable medium. The computer-readable medium includes a computer storage medium and a communication medium, where the communication medium includes any medium that enables a computer program to be transmitted from one place to another. The storage medium may be any available medium accessible to a general-purpose or a dedicated computer.

In the foregoing specific implementations, the objectives, technical solutions, and the benefits of this application are further described in detail. It should be understood that the foregoing descriptions are merely specific implementations of this application.

The foregoing embodiments are merely intended for describing the technical solutions of this application, but not for limiting this application. Although this application is described in detail with reference to the foregoing embodiments, persons of ordinary skill in the art can understand that they may still make modifications to the technical solutions described in the foregoing embodiments, or make equivalent replacements to some technical features thereof, without departing from the scope of the technical solutions of embodiments of this application.

What is claimed is:

1. A method, executed by a first provider edge (PE) device, wherein the method comprises:
   receiving a first border gateway protocol (BGP) route advertisement message sent by a control management device, wherein the first BGP route advertisement message advertises a first virtual private network (VPN) route based on a virtual private network version 4 (VPNv4) address family, a virtual private network version 6 (VPNv6) address family, or a Layer 3 Ethernet virtual private network (L3EVPN) address family, wherein the first VPN route comprises indication information that instructs the first PE device to redirect a VPN route to iterate to a first next hop of a private network, an internet protocol (IP) address prefix of a destination host, wherein the first next hop of the private network is a next hop towards reaching the IP address prefix of the destination host, and a network address of the first next hop towards reaching the IP address prefix, and wherein the network address of the first next hop is a private IP address of the private network;
   generating a first virtual routing and forwarding (VRF) entry based on the indication information, wherein the first VRF entry comprises the IP address prefix and first outbound interface information, and wherein the first outbound interface information identifies a first outbound interface that is of the first PE device and that is connected to the first next hop of the private network, wherein generating the first VRF entry based on the indication information comprises:
  determining, in a local VRF table based on the indication information and the network address of the first next hop of the private network, the first outbound interface information corresponding to the first next hop; and
  generating the first VRF entry based on the IP address prefix and the first outbound interface information; and
controlling network traffic based on the first VRF entry.

2. The method according to claim 1, wherein the first BGP route advertisement message comprises a next hop address field, the indication information is a route distinguisher (RD) comprised in the next hop address field, and the RD is of a non-zero value.

3. The method according to claim 2, wherein the RD identifies a VPN to which the first next hop belongs.

4. The method according to claim 1, wherein the first next hop is a traffic cleaning server.

5. The method according to claim 1, wherein the destination host and the first next hop belong to a same VPN.

6. The method according to claim 1, wherein the destination host and the first next hop belong to different VPNs.

7. The method according to claim 1, further comprising:
  receiving first traffic sent by a first customer edge (CE) device, wherein a destination address of the first traffic and the IP address prefix belong to a same network segment; and
  forwarding the first traffic to the first next hop through the first outbound interface.

8. The method according to claim 1, further comprising:
  receiving a second BGP route advertisement message sent by the control management device, wherein the second BGP route advertisement message advertises a second VPN route, wherein the first BGP route advertisement message and the second BGP route advertisement message use a same VPN address family, wherein the second VPN route comprises the IP address prefix and a network address of a second next hop to reach the IP address prefix, wherein the second next hop is a second PE device, and wherein the first PE device communicates with the second PE device through a public network tunnel; and
  generating a second VRF entry based on the second BGP route advertisement message, wherein the second VRF entry comprises the IP address prefix and second outbound interface information, and wherein the second outbound interface information identifies a second outbound interface that is of the first PE device and that corresponds to the public network tunnel.

9. The method according to claim 8, wherein generating the second VRF entry based on the second BGP route advertisement message comprises:
  determining the second outbound interface information in the local VRF table; and
  generating the second VRF entry based on the IP address prefix and the second outbound interface information.

10. The method according to claim 8, wherein the method further comprises:
  receiving and copying second traffic sent by a second CE device, to obtain third traffic;
  forwarding the second traffic to the first next hop through the first outbound interface; and
  forwarding the third traffic to the second PE device through the second outbound interface.

11. The method according to claim 1, wherein the first PE device is connected to the destination host separately through a first path and a second path, the first path comprises the first next hop, and the method further comprises:
  receiving fourth traffic sent by a third CE device to the destination host; and
  performing load sharing on the fourth traffic through the first path and the second path.

12. The method according to claim 1, wherein the first PE device is a first autonomous system boundary router (ASBR), the first next hop is a second ASBR, the first outbound interface is a private network interface that is of the first ASBR and that is connected to the second ASBR, and the method further comprises:
  receiving fifth traffic, wherein a destination address of the fifth traffic and the IP address prefix belong to a same network segment; and
  forwarding the fifth traffic to the second ASBR through the first outbound interface.

13. A method, executed by a control management device, wherein the method comprises:
  generating a first border gateway protocol (BGP) route advertisement message; and
  sending the first BGP route advertisement message to a first provider edge (PE) device, wherein the first BGP route advertisement message advertises a first virtual private network (VPN) route based on a virtual private network version 4 (VPNv4) address family, a virtual private network version 6 (VPNv6) address family, or a Layer 3 Ethernet virtual private network (L3EVPN) address family, wherein the first VPN route comprises indication information that instructs the PE device to redirect a VPN route to iterate to a first next hop of a private network, an IP address prefix of a destination host, wherein the first next hop of the private network is a next hop towards reaching the IP address prefix of the destination host, and a network address of the first next hop towards reaching the IP address prefix, wherein the network address of the first next hop is a private IP address of the private network, wherein the indication information further instructs the first PE device to generate a first virtual routing and forwarding (VRF) entry, wherein the first VRF entry is generated comprising the IP address prefix and first outbound interface information determined in a local VRF table based on the indication information and the network address of the first next hop of the private network, and wherein the first outbound interface information identifies a first outbound interface that is of the first PE device and that is connected to the first next hop, and wherein the first VRF entry is used by the PE device to control network traffic.

14. The method according to claim 13, wherein the first BGP route advertisement message comprises a next hop address field, the indication information is a route distinguisher (RD) comprised in the next hop address field, and the RD is a non-zero value.

15. The method according to claim 14, wherein the RD identifies a VPN to which the first next hop belongs.

16. The method according to claim 13, wherein the first next hop is a traffic cleaning server.

17. The method according to claim 13, wherein the destination host and the first next hop belong to a same VPN.

18. The method according to claim 13, wherein the destination host and the first next hop belong to different VPNs.

19. A communication apparatus, comprising:
one or more processors; and
a non-transitory computer-readable storage medium storing a program to be executed by the one or more processors, the program including instructions to:
receive a first border gateway protocol (BGP) route advertisement message sent by a control management device, wherein the first BGP route advertisement message advertises a first virtual private network (VPN) route based on a virtual private network version 4 (VPNv4) address family, a virtual private network version 6 (VPNv6) address family, or a Layer 3 Ethernet virtual private network (L3EVPN) address family, wherein the first VPN route comprises indication information that instructs the communication apparatus to redirect a VPN route to iterate to a first next hop of a private network, an IP address prefix of a destination host, wherein the first next hop of the private network is a next hop towards reaching the IP address prefix of the destination host, and a network address of the first next hop towards reaching the IP address prefix, and wherein the network address of the first next hop is a private IP address of the private network;
generate a first virtual routing and forwarding (VRF) entry based on the indication information, wherein the first VRF entry comprises the IP address prefix and first outbound interface information, and wherein the first outbound interface information identifies a first outbound interface that is of the communication apparatus and that is connected to the first next hop of the private network, wherein to generate the first VRF entry based on the indication information, the program includes instructions to:
determine, in a local VRF table based on the indication information and the network address of the first next hop of the private network, the first outbound interface information corresponding to the first next hop; and
generate the first VRF entry based on the IP address prefix and the first outbound interface information; and
control network traffic based on the first VRF entry.

* * * * *